United States Patent

Miyagawa et al.

[11] Patent Number: 5,991,782
[45] Date of Patent: Nov. 23, 1999

[54] AUTOMATED EXTRACTION AND DOUBLY LINKED REFERENCE MARKS FOR PARTIALIZED DOCUMENT CONTENTS AND VERSION CONTROL

[75] Inventors: Junichi Miyagawa; Akiko Kobayashi; Tetsuharu Haraguchi; Yukio Sakaguchi; Akira Hirashima; Makoto Shinka; Yukio Uro; Yoshinori Hosono, all of Kawasaki, Japan

[73] Assignee: Fujitsu Limited, Kawasaki, Japan

[21] Appl. No.: 08/991,880

[22] Filed: Dec. 16, 1997

Related U.S. Application Data

[63] Continuation of application No. 08/389,491, Feb. 16, 1995, abandoned.

[51] Int. Cl.⁶ .................................................. G06F 17/24
[52] U.S. Cl. .......................... 707/513; 707/511; 707/530; 707/514
[58] Field of Search .................................. 707/513, 514, 707/515, 517, 530, 511, 522

[56] References Cited

U.S. PATENT DOCUMENTS

| | | | |
|---|---|---|---|
| 4,949,287 | 8/1990 | Yamaguchi et al. | 707/520 |
| 5,119,491 | 6/1992 | Iwai et al. | 707/513 |
| 5,235,653 | 8/1993 | Nakano et al. | 382/175 |
| 5,339,412 | 8/1994 | Fueki et al. | 707/104 |
| 5,341,469 | 8/1994 | Rossberg et al. | 707/514 |
| 5,357,631 | 10/1994 | Howell et al. | 707/203 |
| 5,481,664 | 1/1996 | Hiroya et al. | 345/302 |
| 5,495,581 | 2/1996 | Tsai | 707/526 |
| 5,537,526 | 7/1996 | Anderson ert al. | 707/515 |
| 5,553,217 | 9/1996 | Hart et al. | 707/521 |
| 5,555,362 | 9/1996 | Yamashita et al. | 707/517 |
| 5,581,760 | 12/1996 | Atkinson et al. | 395/702 |

FOREIGN PATENT DOCUMENTS 3-161864   7/1991   Japan .

*Primary Examiner*—Joseph H. Feild
*Attorney, Agent, or Firm*—Staas & Halsey LLP

[57] ABSTRACT

When a content to be partialized is specified to a document, the document creation supporting system records the content of the part in a file separated from the document together with a part holding mark, adds a part reference mark at the position where the part is specified in the document and deletes the content of the part from the document in order to be able to readily confirm the consistency of the part and version number when the document is updated and to be able to confirm contents of documents among a plurality of documents.

22 Claims, 39 Drawing Sheets

FIG. 19A
FIG. 19B
FIG. 19C
FIG. 19D
FIG. 19E
FIG. 19F
FIG. 19G

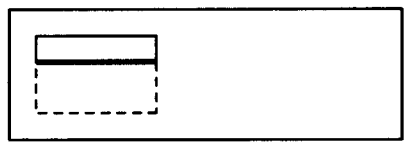

———  : BLUE (ORIGINAL VERSION)
———  : RED (EDIT VERSION)
- - - : PURPLE (OVERLAP OF
         ORIGINAL VERSION AND
         EDIT VERSION)

FIG. 40A

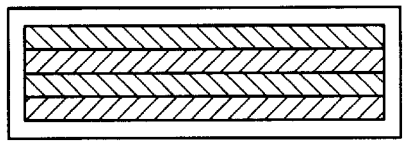

▨ : EDIT VERSION
▧ : ORIGINAL VERSION

FIG. 40B

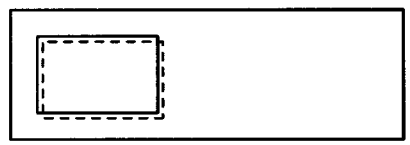

——— : EDIT VERSION
- - - : ORIGINAL VERSION

FIG. 40C

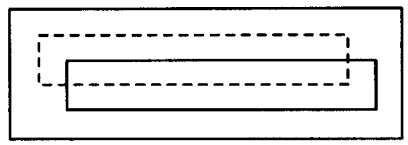

——— : EDIT VERSION
- - - : ORIGINAL VERSION
         FLASH ALTERNATELY

FIG. 40D

——— : LOW (ORIGINAL VERSION)
——— : HIGH (EDIT VERSION)
- - - : MIDDLE (OVERLAP OF
         ORIGINAL VERSION AND
         EDIT VERSION)

FIG. 40E

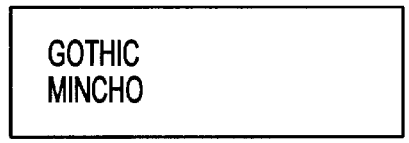

GOTHIC : EDIT VERSION
MINCHO : ORIGINAL VERSION

FIG. 40F

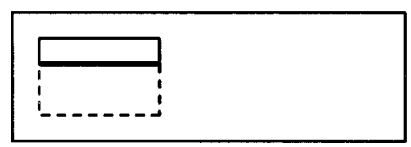

——— : THIN LINE (ORIGINAL VERSION)
——— : THICK LINE (EDIT VERSION)
- - - : DOTTED LINE (OVERLAP OF
         ORIGINAL VERSION AND
         EDIT VERSION)

FIG. 40G

AUTOMATED EXTRACTION AND DOUBLY LINKED REFERENCE MARKS FOR PARTIALIZED DOCUMENT CONTENTS AND VERSION CONTROL

RELATED APPLICATION

This is a continuation of 08/389,491, filed Feb. 16, 1995, abandoned.

BACKGROUND OF THE INVENTION

1. Field of the Invention

The present invention relates to partializing data in a document, and more particularly, to creating a new document using the partialized data based on a part holding mark and a part reference mark.

2. Description of the Related Art

It has become common to create electronic document information by using a computer in recent years and, passing through the stage of utilizing computers in creating documents, it is now almost on the stages of advancing document creation functions, of standardizing document informations and of guaranteeing the quality of documents.

In such circumstances, a move for partializing existing documents has emerged in order to advance the document creating functions. Such move has emerged because it is considered that an efficiency in creating a new document may be improved by creating the document as parts and reusing the parts since the same or related contents are often described repeatedly in a plurality of documents prepared in a predetermined flow.

Furthermore, a move for standardizing document structures by the Standard Generalized Markup Language (SGML) which is an international standard has emerged in order to guarantee the quality of documents. Such move has emerged because it is considered to be necessary to standardize documents and to reliably describe necessary contents to guarantee the quality of documents.

Note that when a document is partialized, it is necessary to match version numbers between the partialized document and a document created by reusing the parts in order to accurately succeed the document information.

Furthermore, it is necessary not only to check the document structure but also to confirm that the contents have been correctly described without leak to guarantee the quality of the document.

However, there has been no prior art document creation supporting system which takes account of matching version numbers and of confirming document contents heretofore.

On the other hand, operations for designing documents such as adjustments of a plurality of document configurations, document type definitions and relationship of document elements between two documents are necessary in order to process documents by computers and to effectively and actively use such information.

However, there is a problem that a burden imposed on operators of such designing works described above is expected to become very heavy from the experiences in designing and describing computer programs up to now.

SUMMARY OF THE INVENTION

Accordingly, it is an object of the present invention to solve the aforementioned problems by providing a document creation supporting system which allows to partialize existing documents and to create a document by reusing the parts and can support the confirmation of document contents among a plurality of prepared documents, confirmation of consistency of parts and version numbers, confirmation of contents of description and prevention of leaks of description.

The present invention also relieves the burden of document design works for computer processing by allowing to visually edit a plurality of document configurations, document type definitions, relationship of document elements between two documents and document reference format definition, to display and store them and to cross-reference the relationship of document elements between documents in the document entities and by referencing the document entities based on the document reference format definition.

A document creation supporting system of the present invention is one which partializes at least a part of contents described in a document. When a content to be partialized is specified to a document, the system records the content of the part in a separate file from the document together with a part holding mark having a title indicating that the part is held, document name of a document referencing the part and identifier corresponding to a type of the part, adds a part reference mark having a title indicating that the part is to be referenced, file name and file format of the file in which the content of the part is stored, the identifier corresponding to the type of the part and version number information of the part and deletes the content of the part from the document.

According to the document creation supporting system of the present invention, the content of the part and part holding mark are recorded in the separate file from the document by specifying the content to be partialized to the document. Next, the part reference mark is added at the position where the part of the document is specified and then the content of the part is deleted from the document.

Further, the document creation supporting system is constructed so as to create a document by providing with a display section for displaying a screen for showing a configuration of a document to be designed by a user, a document name analyzing section for inputting input data of document names input by the user within frames on the screen by input section and for analyzing document names from the input data, a document name registering section for registering the document names analyzed by the document name analyzing section in a memory, a position analyzing section for analyzing positions of the frames surrounding the document names described on the screen and specified by the input data input to the screen by the input section and position of a link line input so as to connect the two frames by other input data, a position registering section for registering the positions of the frames analyzed by the position analyzing section by correlating with the corresponding document names in a temporary holding memory, a link symbol generating section for reading the two document names corresponding to the position of the link line analyzed by the position analyzing section from the data held in the memory via a registered information input section to generate a link symbol which corresponds to the two document names and a link symbol registering section for registering the link symbol generated by the link symbol generating section in a memory by correlating with the two document names to correlate with the two document names within the frames on the screen and by storing by adding the unique link symbol.

By constructing as described above, such design information as the document configurations document type definition, link definition and reference format definition is input following to the input of the user and such processing as analysis of document name, position analysis, relation analysis, relation conversion, conversion of the reference format definition and analysis of reference format is implemented in each circuit region corresponding to the design information and is then held in a corresponding memory.

Accordingly, the use of information held as such allows the document conversion and document reference.

BRIEF DESCRIPTION OF THE DRAWINGS

FIGS. 19a through 19g are diagrams for explaining a seventh embodiment;

FIG. 39 is a flowchart showing a processing procedure in the fourteenth embodiment; and FIGS. 40A through 40G are explanatory diagrams showing displayed screens of the fourteenth embodiment.

DETAILED DESCRIPTION OF PREFERRED EMBODIMENTS

Figure 1:
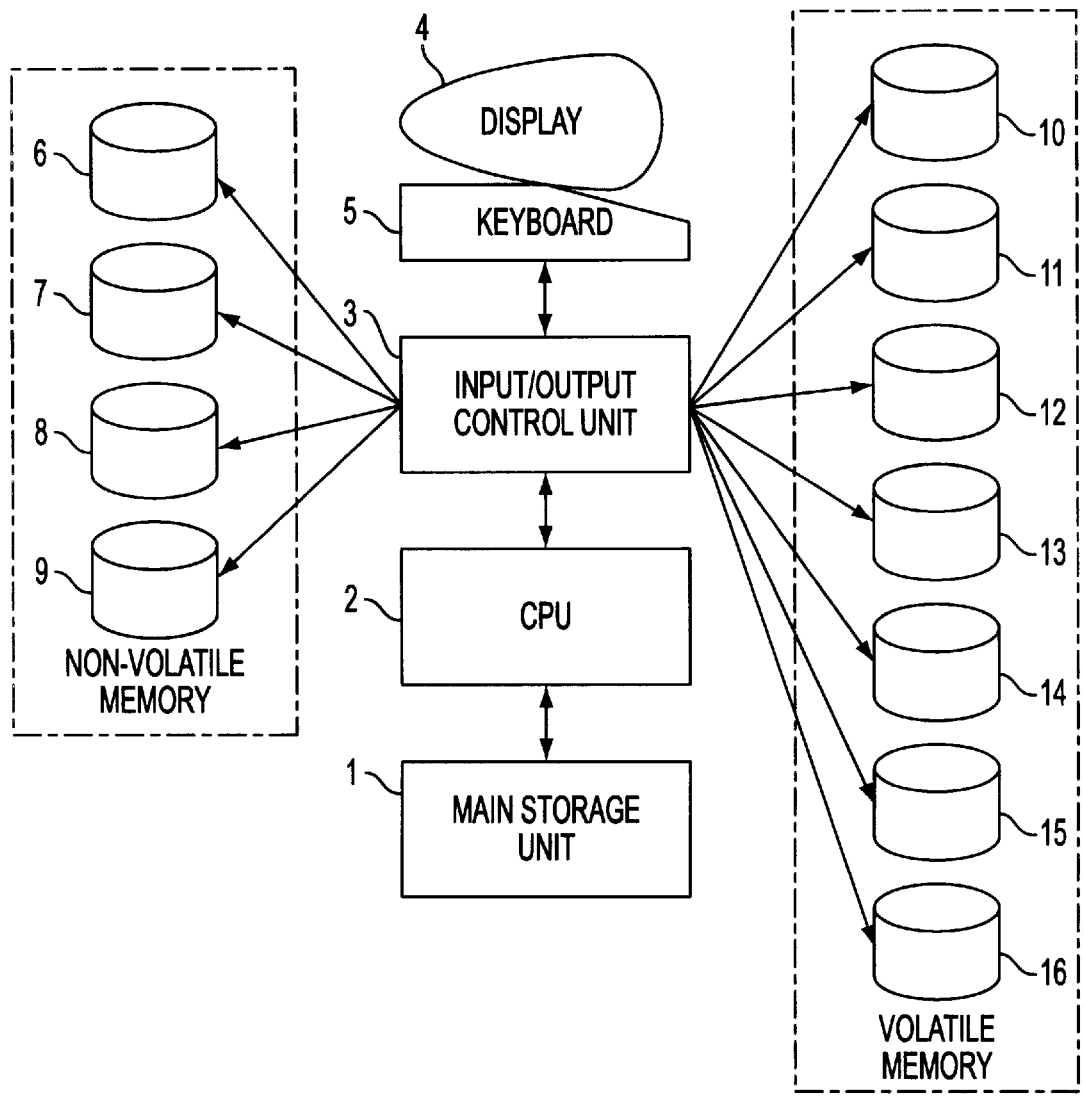
FIG. 1 is a block diagram centering on a hardware configuration of a preferred embodiment of the present invention.

Referring now to the drawings, preferred embodiments of the present invention will be explained.

FIG. 1 is a block diagram of a system configuration of a document creation supporting system of the present invention. As seen in FIG. 1, this system is provided with a main storage 1. The main storage 1 contains programs of this system, structured document management database unit, version number managing unit and mark input unit. The main storage 1 is connected with a central processing unit (CPU) 2 for executing the program of the system. The CPU 2 is connected with an input/output control unit 3 for controlling input/output between a non-volatile memory and a volatile memory.

The structured document management database unit stores structured documents and manages version numbers per each structure. The 'structured document' refers to 'a document described by fractionizing (header, text, trailer, etc.) and hierarchizing (part, chapter, section, paragraph, etc.) its logical contents.

The non-volatile memory stores document design information and is composed of a document file 6, parts file 7, reservation limit management information file 8 and document development process information file 9.

The volatile memory is composed of a display document content buffer 10, specified range buffer 11, specified range content buffer 12, intra-mark information buffer 13, document table buffer 14, element table buffer 15 and parts position control information buffer 16 for tentatively storing information input by an user and information on processing in the system.

The input/output control unit 3 is connected with a keyboard 5 by which the user input various information and a display 4 for displaying contents of prepared documents, information on documents and messages for the user.

[First Embodiment]

Figure 2A:
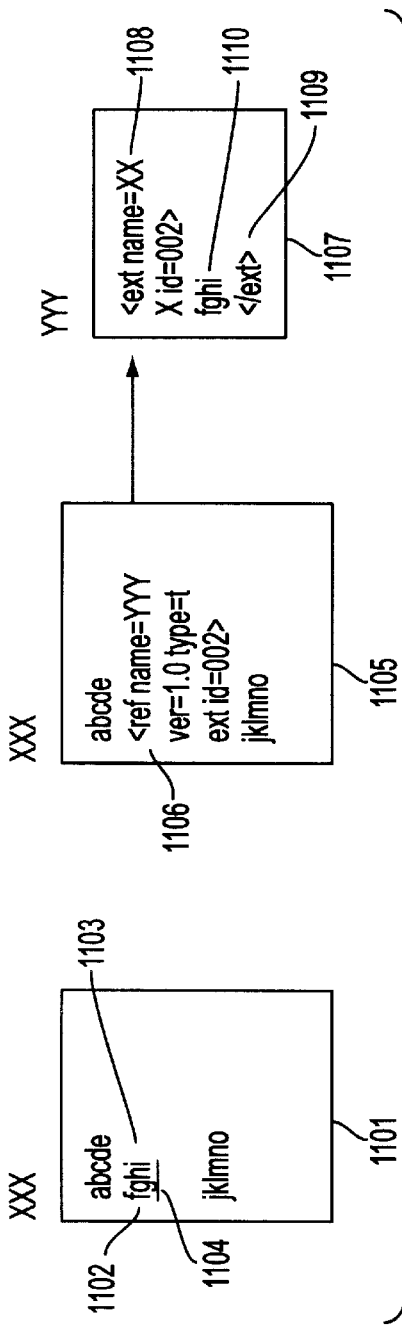
FIGS. 2a and 2b are diagrams for explaining a first embodiment.

Next, a first embodiment will be explained with reference to FIGS. 2a and 2b. This first embodiment represents a case when a portion of contents described in a document is partialized.

At first, a document XXX 1101 stored in the document database is displayed. Then, a start point 1102 and end point 1103 are specified in the document XXX to specify a range of content "fghi" 1104 to be partialized.

Next, a part file YYY 1107 in which the specified range are surrounded by marks <ext name=XXX id=002> 1108 and </ext> 1109 is generated. Here, "ext" in the mark is a name indicating that the element is referenced by another document, "name=XXX" is a document name of a referenced document and "id=002" is an identifier of a part element (information for uniquely defining and discriminating each individual element).

Next, a mark <ref name=YYY ver=1.0 type=-text id=002> 1106 is inserted to the original document XXX to automatically delete the content stored in the part file from the original document. Here, "ref" in the mark is a name indicating that another document is referenced, "name=YYY" is a file name of the generated part, "ver=1.0" is version number information of the part, "type=text" is a file format of the part and "id=002" is the identifier of the part element.

Because the above processing allows to recognize the storage position of the entity of the content deleted from the original document XXX 1105 by the marks, the existing contents may be composed by the parts when referenced, without missing any information before the partialization.

Figure 3:
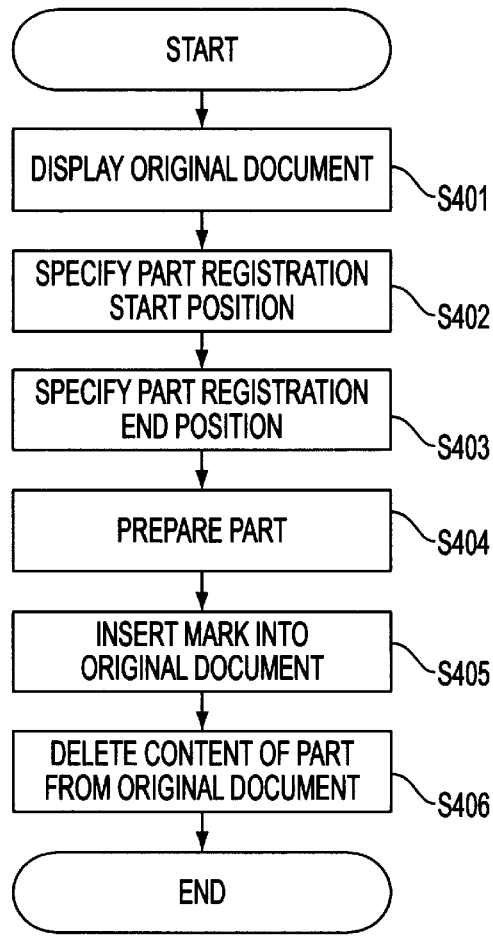
FIG. 3 is a flowchart showing a processing procedure in the first embodiment.

FIG. 3 is a flowchart showing the above processing procedure. In FIG. 3, the (referenced) original document is displayed (S401). Next, the part registration start position is specified (S402) and the part registration end position is specified (S403). Then, the part is prepared (S404). Next, the mark <:ref> is inserted to the (referenced) original document (S405). Finally, the content of the part is deleted from the (referenced) original document (S406).

Figure 2B:
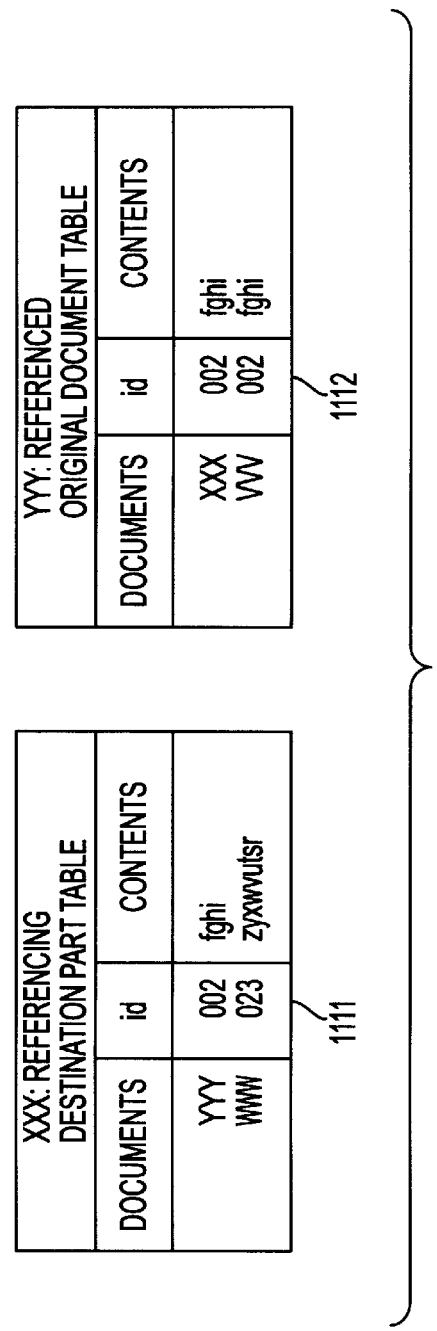

Note that a referencing part table 1111 in FIG. 2b may be displayed by reading information on the referencing document name and part element identifier contained in the mark <ref> from the part referenced document. A referenced document table 1112 may be also displayed by reading information on the referenced document name and part element identifier contained in the mark <ext> from the referencing part. Furthermore, each entity may be displayed and a use state of the part may be confirmed mutually from the referencing part table 1111 and referenced document table 1112.

Figure 4:
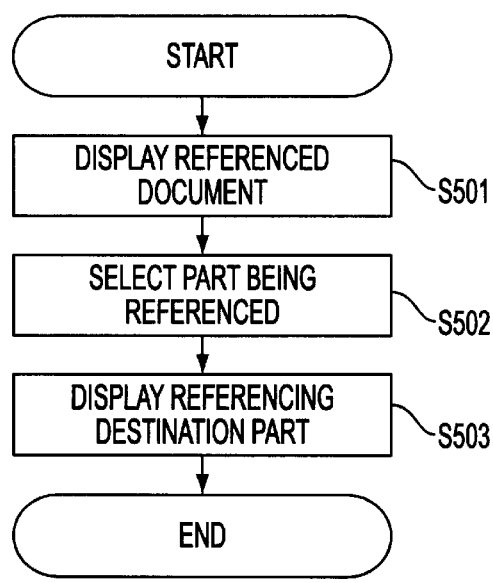
FIG. 4 is a flowchart showing a processing procedure in the first embodiment.
Figure 5:
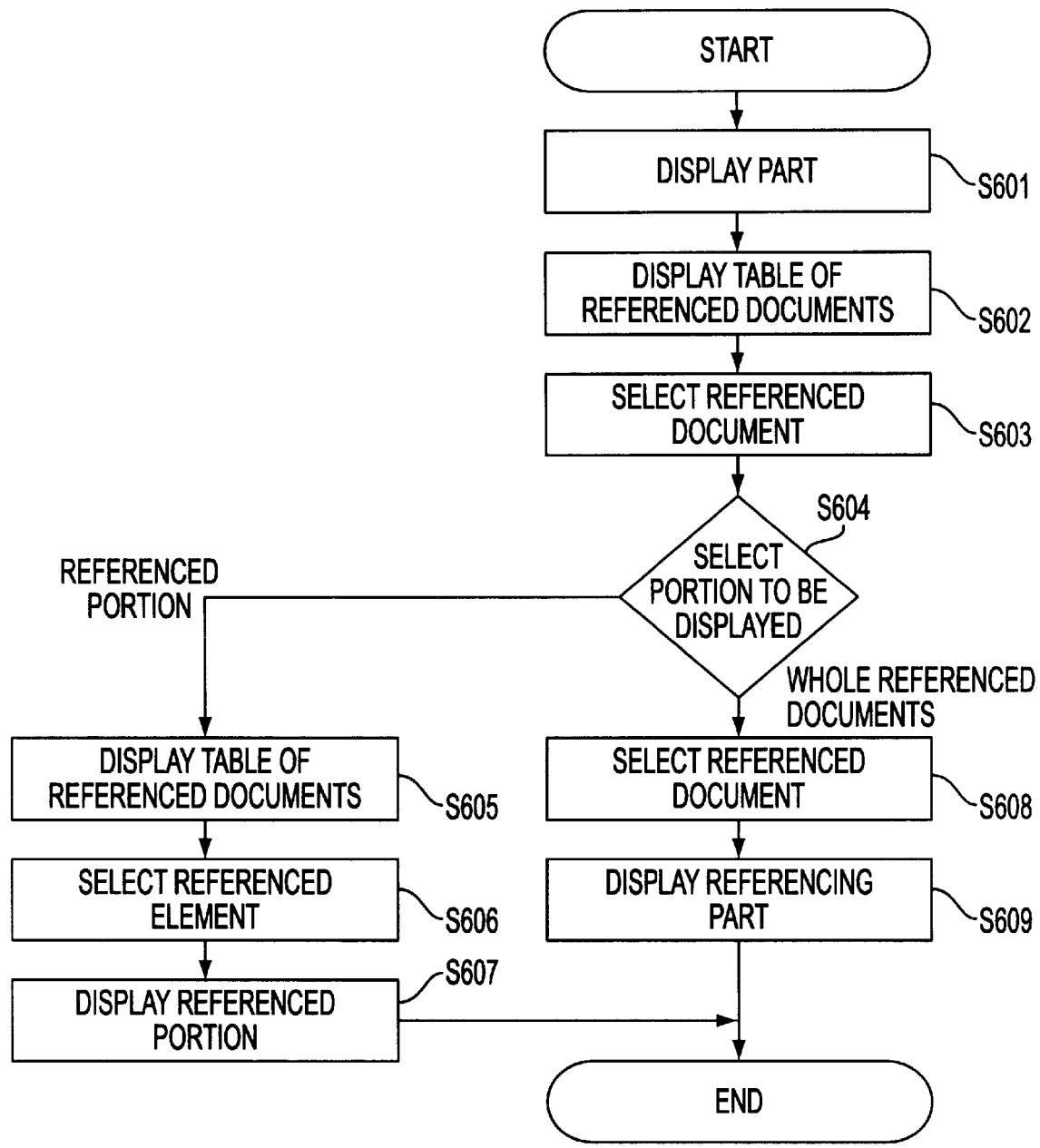
FIG. 5 is a flowchart showing a processing procedure in the first embodiment.

FIGS. 4 and 5 are flowcharts showing the above processing procedures. As shown in FIG. 4, the referenced document is displayed at first (S501). Next, the referenced part is selected (S502). Finally, the referencing part is displayed (S503).

In FIG. 5, the part is displayed at first (S601). Next, the referenced document table is displayed (S602). Then the referenced document is selected (S603). Here a selection of a portion to be displayed is made (S604). When a referenced portion is selected, a referenced element table screen is displayed (S605). Then a referenced element is selected (S606) and finally the referenced portion is displayed (S607).

When the whole referenced document is selected in step S604 on the other hand, the referenced document is displayed (S608) and then the referencing part is displayed (S609).

[Second Embodiment]

Next, a second embodiment will be explained with reference to FIGS. 6a and 6b. The second embodiment represents a case when another document YYY 204 utilizes a portion of contents described in a document xxx 201 as a part.

At first, the documents XXX 201 and YYY 204 are displayed. Then, a start point 202 and end point 203 are specified in the document XXX to specify a portion to be treated as a part.

Figure 6:
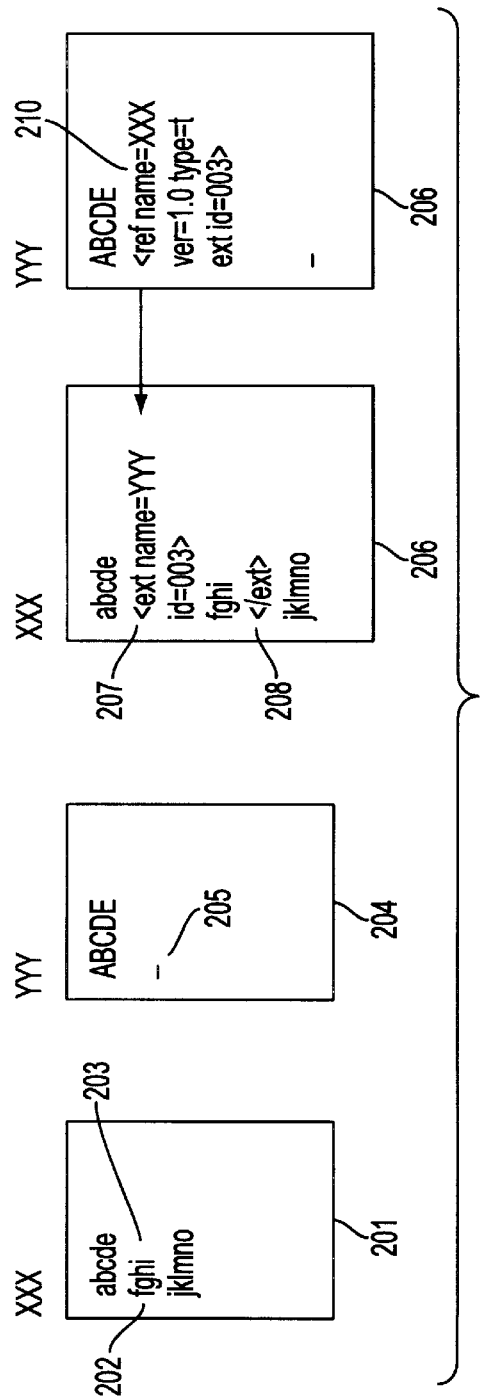
FIGS. 6a and 6b are diagrams for explaining a second embodiment.

Then, the portion to be treated as the part is surrounded by marks <ext name=XXX id=003> 207 and </ext> 208 (see 206 in FIG. 6a). Here, "ext" in the mark is a name indicating that the portion is referenced as the part from the outside, "name=YYY" is a document name of the referenced document and "id=003" is an identifier of the part element.

Next, a position 205 where the part is referenced is specified in the part referencing file YYY 209 and a mark <ref name=XXX ver=1.0 type=text id=003> 210 is inserted. Here, "ref" in the mark is a name indicating that the part is to be referenced, "name=XXX" is a file name where the part to be referenced exists, "id=003" is an identifier of the element of the part to be referenced, "ver=1.0" is version number information of the referencing part and "type=text" is a file format information of the referencing part.

The above processing allows the part referenced file to recognize the storage position of the part by the mark and to compose a document from the part without having the entity of the part even if it exists within the referencing file.

Figure 7:
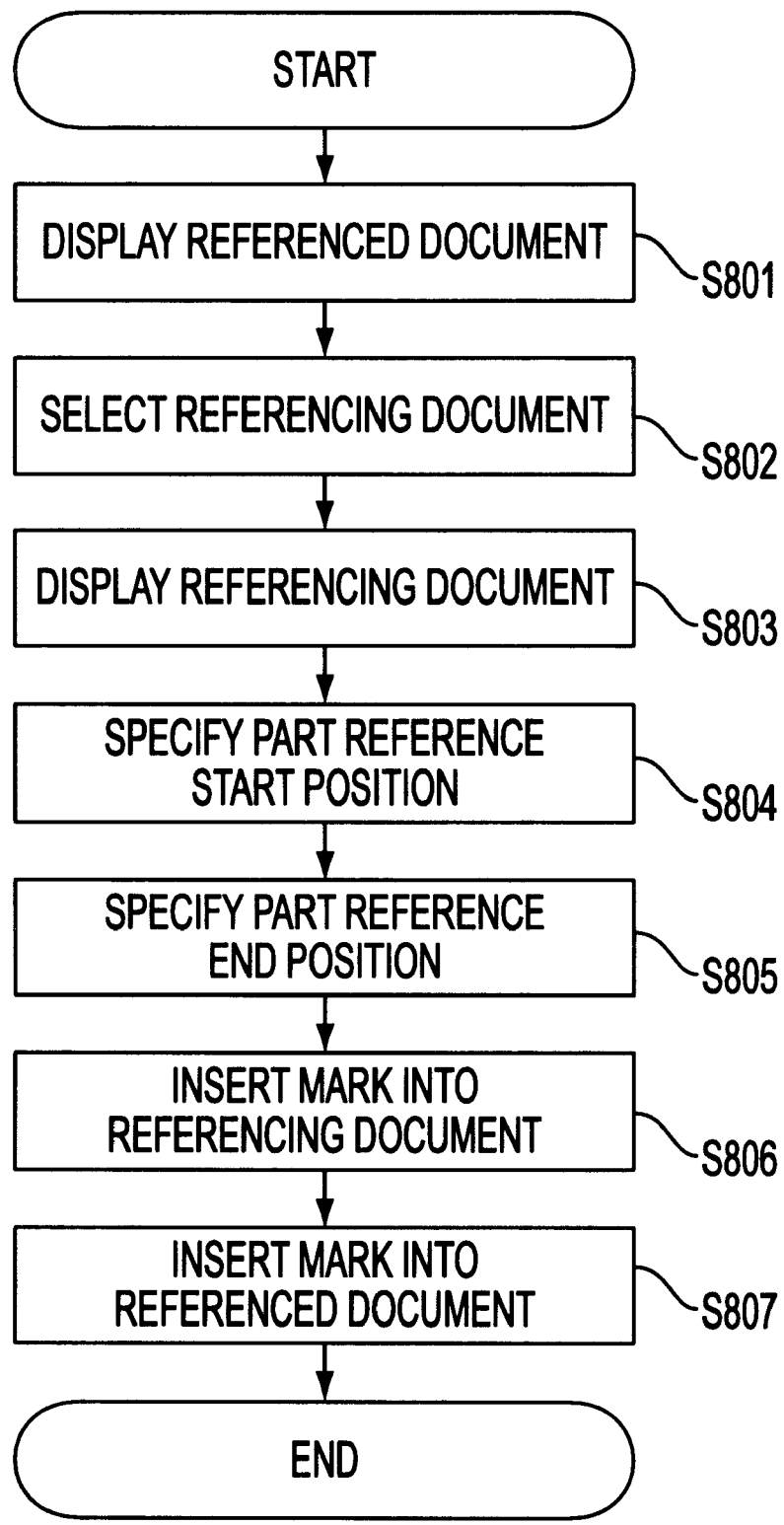
FIG. 7 is a flowchart showing a processing procedure in the second embodiment.

FIG. 7 is a flowchart showing the above processing procedure. As shown in FIG. 7, the referenced document is displayed at first (S801). Next, the referencing document is selected (S802) and is displayed (S803). Next, the part reference start position is specified (S804) and part reference end position is specified (S805). Then, the mark <ref> is inserted to the referencing document (S806). Finally, the mark <ext> is inserted to the referenced document (S807).

Note that a referencing part table 211 in FIG. 6b may be displayed by reading information on the referencing document name and part element identifier contained in the mark <ref> from the part referenced document. A referenced document table 212 may be also displayed by reading information on the referenced document name and part element identifier contained in the mark <ext> from the referencing part. Furthermore, the referencing part table 211 and referenced document table 212 allow to display each entity and to confirm the use state of the part.

Figure 9:
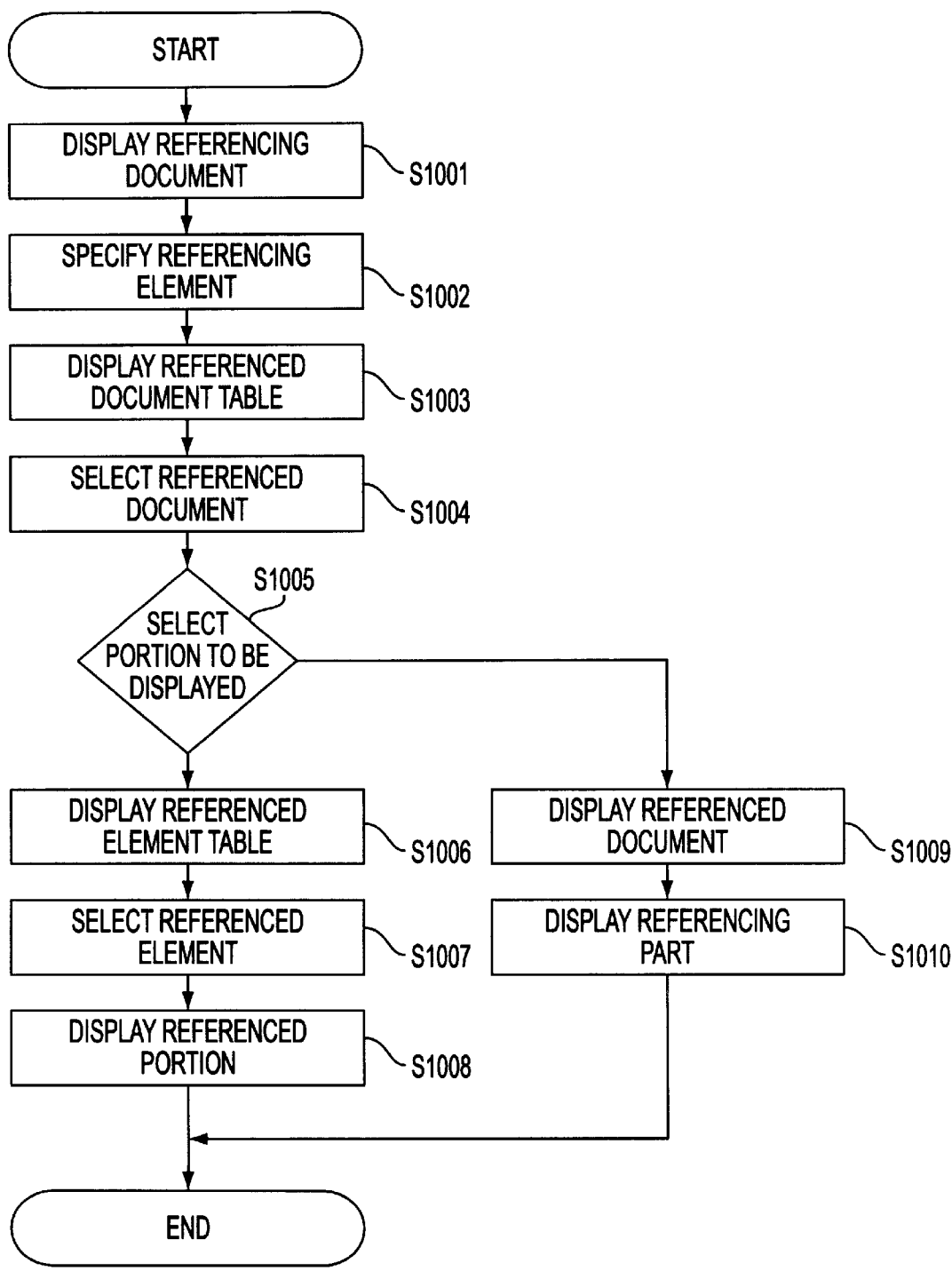
FIG. 9 is a flowchart showing a processing procedure in the second embodiment.

FIG. 3 is a flowchart showing the processing procedure for confirming the referencing part and FIG. 9 is a flowchart showing the processing procedure for confirming the referenced document.

Figure 8:
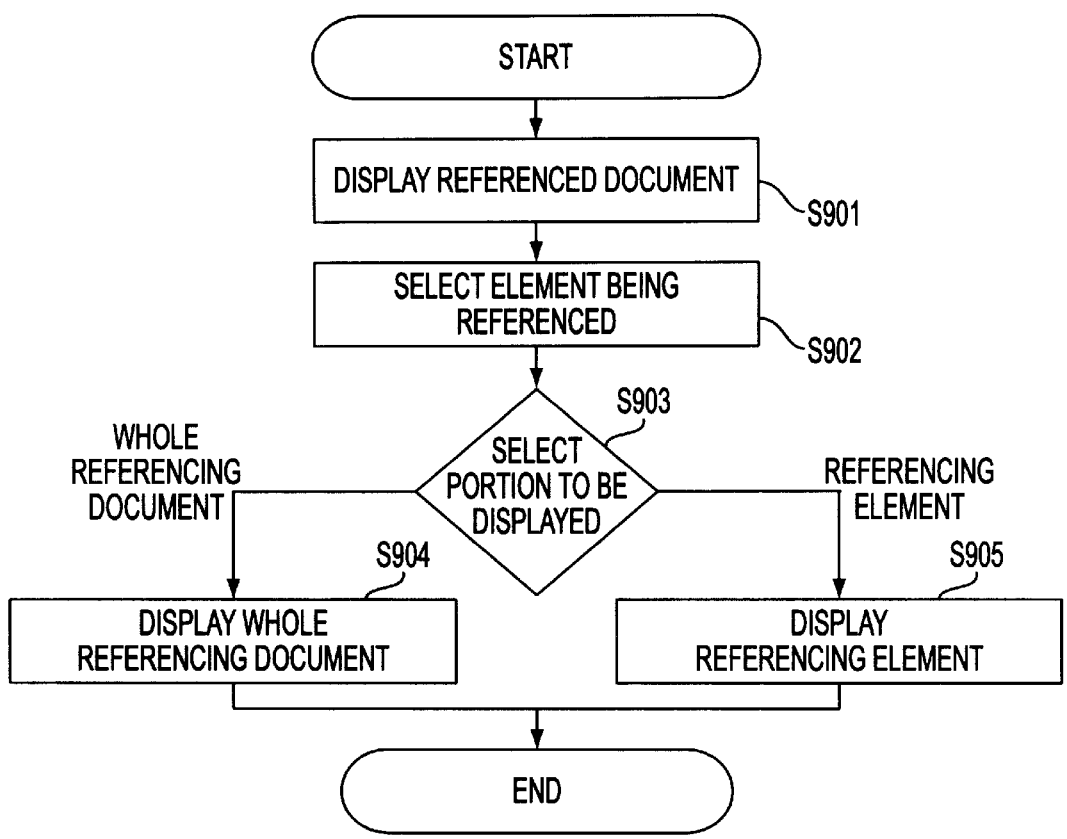
FIG. 8 is a flowchart showing a processing procedure in the second embodiment.

In FIG. 8, the referenced document is displayed at first (S901). Next, the element to be referenced is selected (S902). Here, a selection of a portion to be displayed is made (S903). When the whole referencing document is selected, the whole referencing document is displayed (S904). When the referencing element is selected on the other hand, the referencing element is displayed (S905).

In FIG. 9, the referencing document is displayed at first (S1001). Next, the referencing element is specified (S1002). Then, the referencing document table is displayed (S1003).

Next, the referenced document is selected (S1004). Here, a selection of a portion to be displayed is made (S1005). When the referenced portion is selected, the referenced element table is displayed (S1006). Next, the referencing element is selected (S1007) and finally, the referenced portion is displayed (S1008). When the whole referenced document is selected on the other hand, the referenced document is displayed at first (S1009) and finally, the referencing part is displayed (S1010).

[Third Embodiment]

A third embodiment will be explained with reference to FIGS. 10a and 10b.

When a document YYY 304 to be displayed on a screen is specified at first, a buffer for the document YYY is generated and "ABCDE" on the first line of the document YYY is read into the buffer. Next, a mark <ref> 305 is read and the mark name "ref" causes to recognize that the document YYY is referencing a part in another document.

Next, attributes contained in the mark <ref> 305 are read and specifications that document is XXX, version is 1.0, type is text and id is 003 cause to retrieve a mark <ext> of the document XXX and to retrieve an element whose id attribute is 003 within that.

Then, a range of the element is recognized by marks <ext name=YYY id=003> 302 and </ext> 303 described at the start and end positions of the result of the retrieval and "fghi" on the fourth line of the document XXX which corresponds to its content is read into the buffer. Finally, "JKLMNO" on the final line of the document YYY is taken into the buffer.

Figures 10A, 10B:
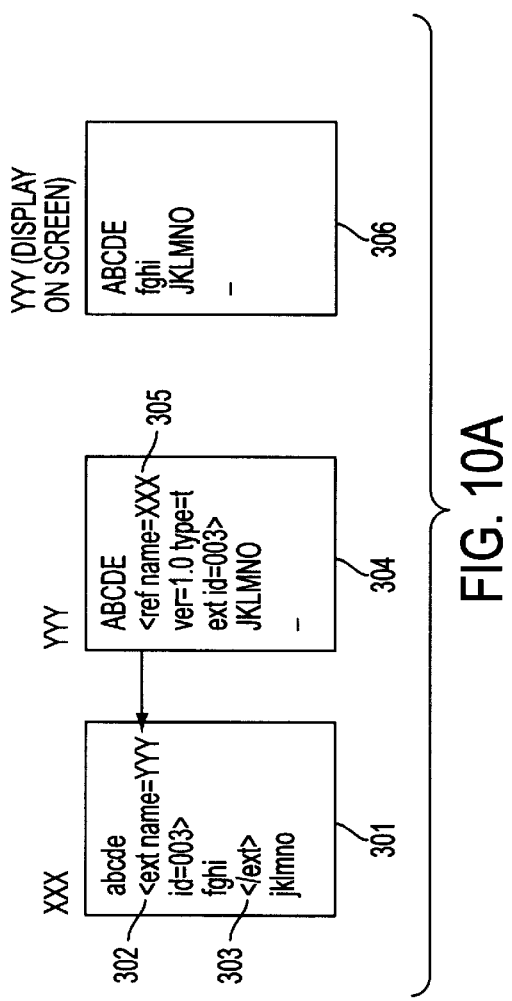
FIGS. 10a and 10b are diagrams for explaining a third embodiment.

The above processing causes the document YYY to be displayed on the screen while taking in the part as shown by 306 in FIG. 10a. When the part element is read into the buffer, the part start and end positions within the buffer are memorized at positions in byte 307 to recognize the part element within the displayed contents of the referenced document.

Figure 11:
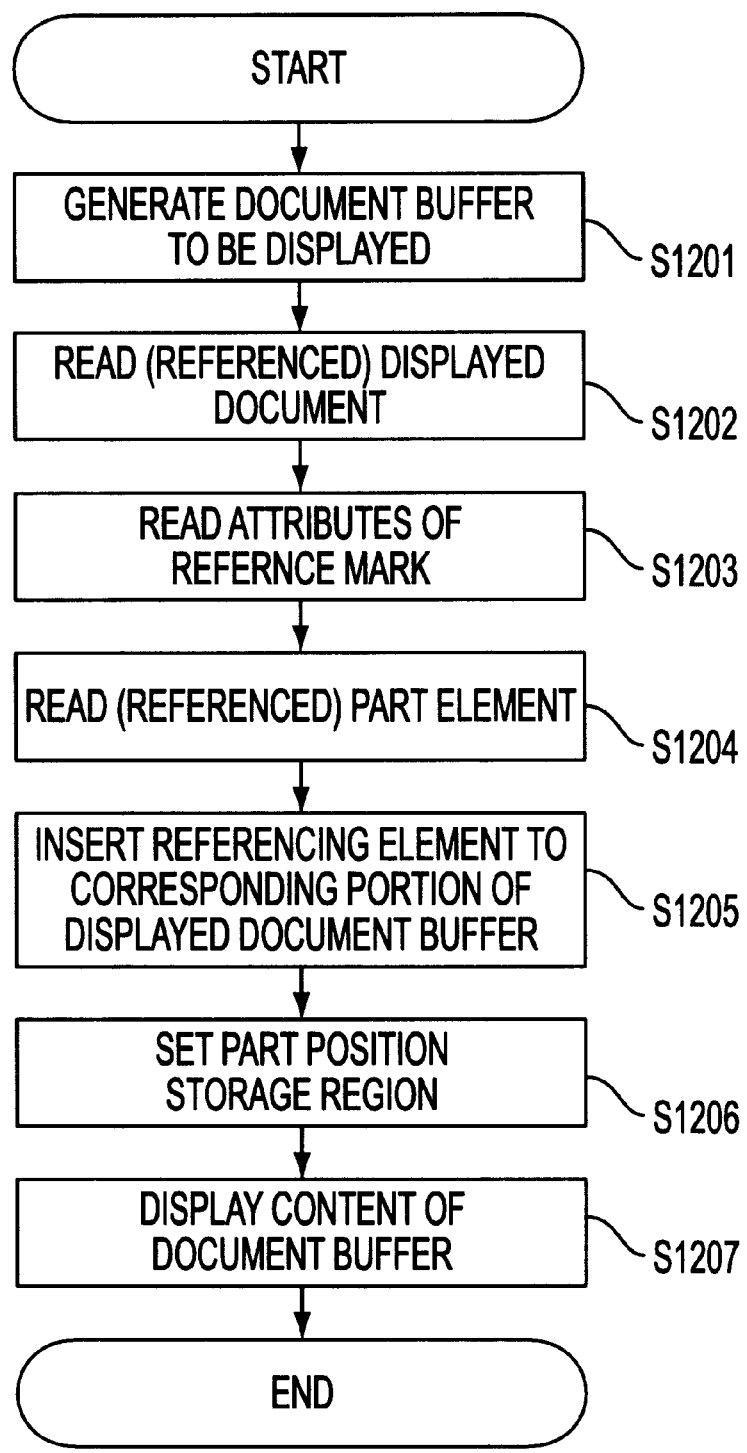
FIG. 11 is a flowchart showing a processing procedure in the third embodiment.

FIG. 11 is a flowchart showing the above processing procedure. In FIG. 11, the buffer for the document to be displayed is generated at first (S1201). Next, the (referenced) document to be displayed is read (S1202), the attributes of the reference mark are read (S1203) and the (referencing) part element is read (S1204). Then, the referencing element is inserted to the corresponding portion of the buffer for the document to be displayed (S1205). Next, the part position storage region is set (S1206). Finally, the content of the document buffer is displayed (S1207).

[Fourth Embodiment]

Figure 12A:
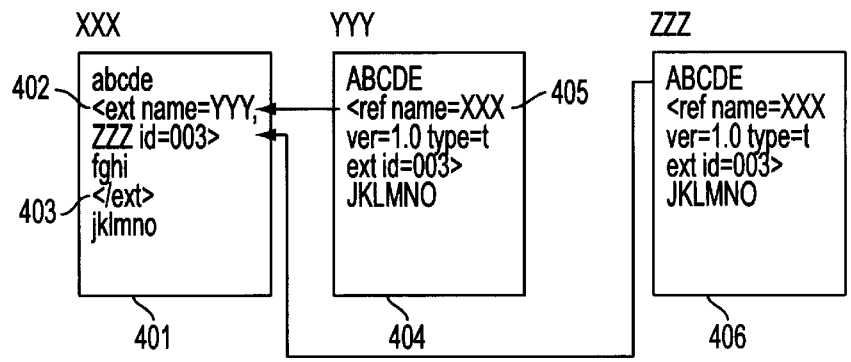
FIGS. 12a, 12b and 12c are diagrams for explaining a fourth embodiment.
Figure 12B:
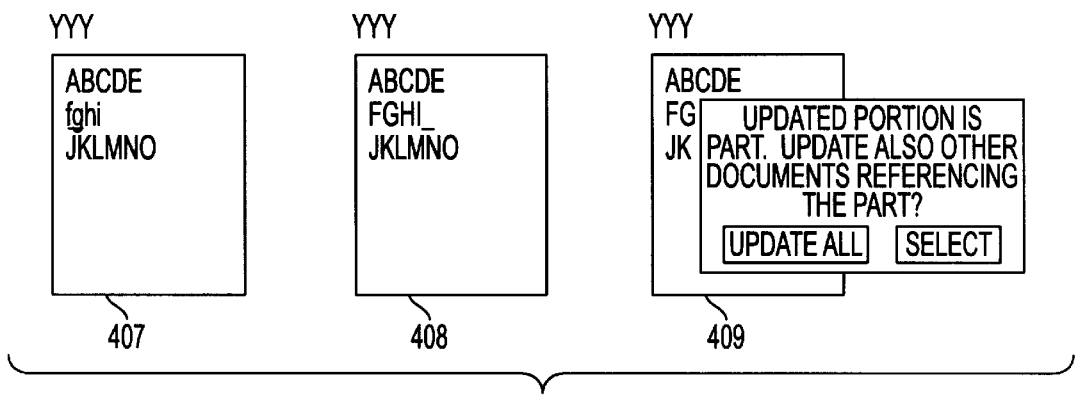
Figure 12C:
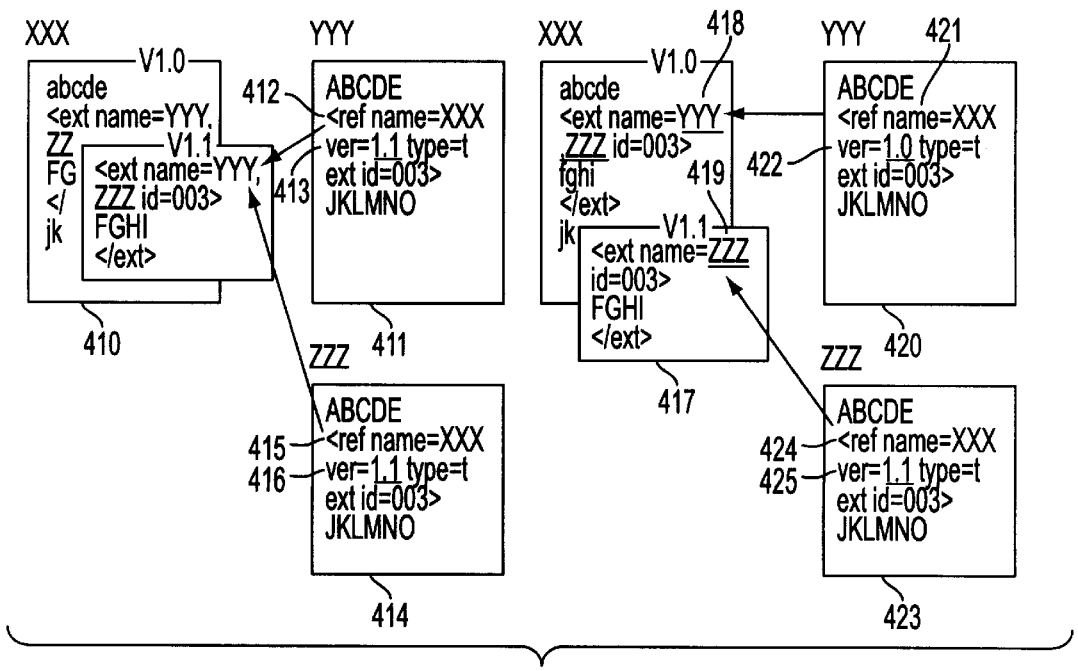

Next, a fourth embodiment will be explained with reference to FIGS. 12a, 12b and 12c. The fourth embodiment represents a case when a referenced document YYY 404 and referenced document ZZZ 406 are referencing an element (hereinafter referred to as a referencing part) within a referencing document XXX 401.

In the figures, the reference numerals 401, 404 and 406 show a relationship among the referenced documents and referencing document and 407, 408 and 409 show images of referencing screens when a part portion is rewritten from the referenced document. The reference numerals 410, 411 and 414 illustrate a case when the whole referenced document is updated along an update of the part and 417, 420 and 423 illustrate a case when a selection is made whether an update is made or not per each referenced document along the update of the part.

When "fghi" (407: displayed on the screen of the document YYY) which is a content of the referencing document within the document XXX is changed as "FGHI" (408: displayed on the screen of the document YYY), it is determined at first whether the updated portion is a part or not from the part position management region.

While the edition is continued as it is when the updated portion is not a part, a referencing document name name=XXX, identifier of the part element id=003 and version number information ver=1.0 contained within the mark <ref> 405 existing within the referenced document YYY 404 are read when the updated portion corresponds to the part. Note that the mark <ref> indicates that the part is referenced.

Then the document XXX 401 is retrieved, a range surrounded by marks <ext> 402 and </ext> 403 contained in the document XXX and whose id agrees is recognized as the part and the update of the part is started. Note that the mark <ext> indicates that the part is referenced from another document.

At this time, part version number information 413 and 416 contained in marks <ref> 412 and 415 existing within all the documents 411 and 414 which are referencing the part are all updated automatically based on the document names YYY and ZZZ of the referenced document contained in the mark <ext>.

Here it is possible to select whether the content of the documents referencing the part should be updated per each document or not. Such selection is specified by an interactive window 409 for example.

When it is selected to update all other documents referencing the part within the document XXX 410, the part version number information ver 413 and 416 contained in the marks <ref> 412 and 415 existing within the referenced documents YYY 411 and ZZZ 414 is updated from "1.0" to "1.1" in all the referenced documents.

Next, the process when the update of the documents referencing the part within the document XXX 417 is selected per each document will be explained. Assume here that the referencing part is not updated in the referenced document YYY 420 and that it is updated in the referenced document ZZZ 423.

As for the document YYY 420, the part version number information ver 422 contained in the mark <ref> 421 is not updated and is reserved as it is, succeeding the previous version number.

On the other hand, the part version number information ver 425 contained in the mark <ref> existing within the document ZZZ 423 is updated. It allows to freely select the part before and after the update even when the referencing part is updated. At this time, in the referencing document XXX 417, names of other documents 418 and 419 in which the part is referenced may be automatically rewritten corresponding to the part version number specified in the referenced documents YYY and ZZZ 420 and 423. It allows to eliminate a divergence of consistency between the document and the part.

Figure 13:
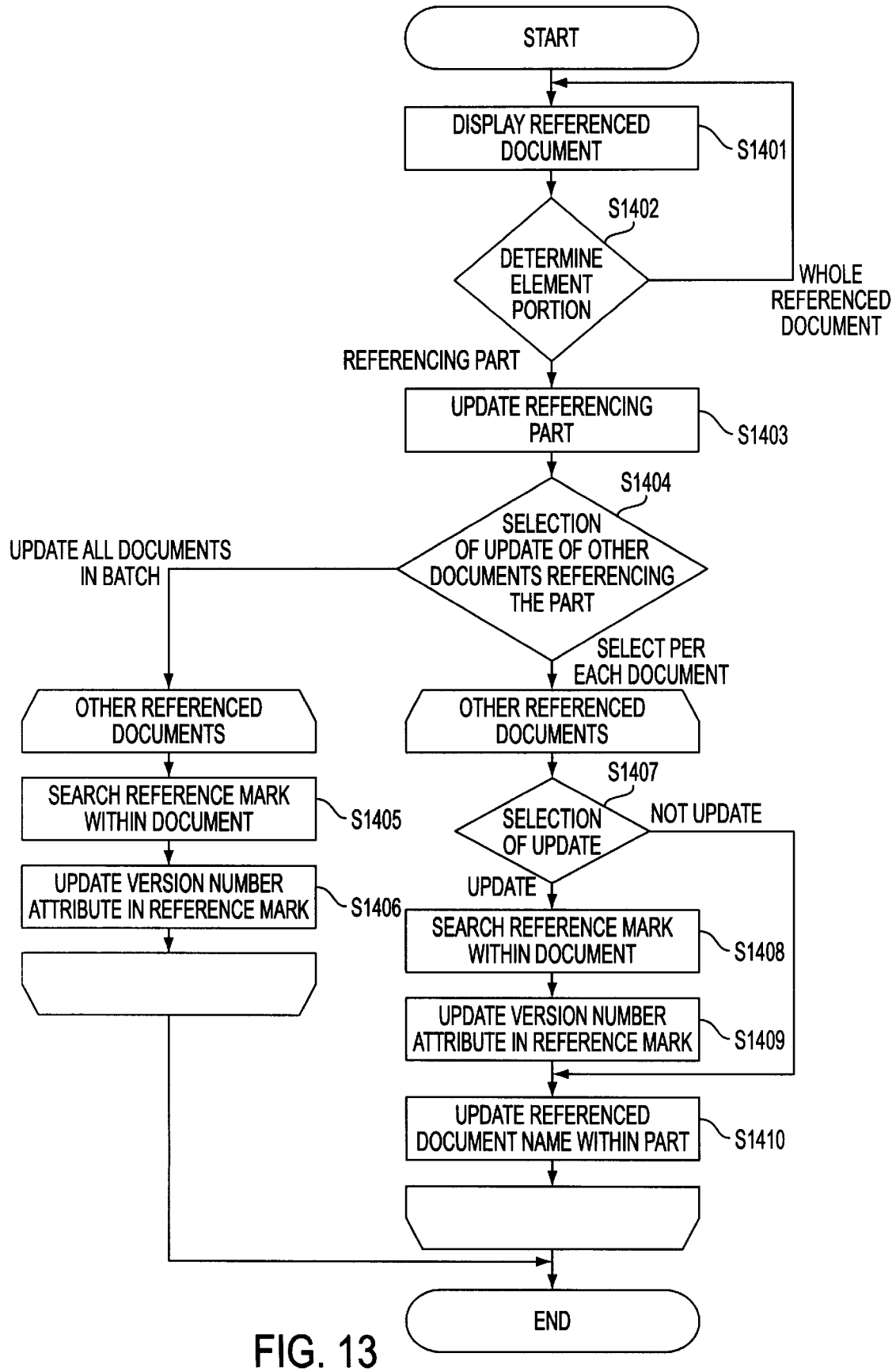
FIG. 13 is a flowchart showing a processing procedure in the fourth embodiment.

FIG. 13 is a flowchart showing the above-mentioned processing procedure. In FIG. 13, the referenced document is displayed at first (S1401). Next, it is determined whether the updated portion is the "referencing part" or "whole referenced document" (S1402). When it is determined to be the "whole referenced document" in S1402, the process returns to S1401. When it is determined to be the "referencing part" in S1402, the referencing part is updated (S1403). Then, it is determined whether the other documents referencing the referencing part should be "updated all in batch" or "updated per each document" (S1404).

When the "update all document in batch" is selected in S1404, the reference marks in other (referenced) documents are searched (S1405) covering all the other referenced documents and the version number attribute is updated (S1406). Note that the steps S1405 and S1406 are repeatedly executed.

When the "update per each document" is selected in S1404 on the other hand, it is determined whether to update or not the selected other referenced documents (S1407). When it is determined to update in S1407, the reference mark within the document is searched (S1408). Then, the version number attribute in the reference mark is updated (S1409). The referenced document name within the part is updated (S1410) when it is determined not to update in S1407 and after S1409. Note that the steps from S1407 to S1410 are repeatedly executed.

[Fifth Embodiment]

Figure 14A:
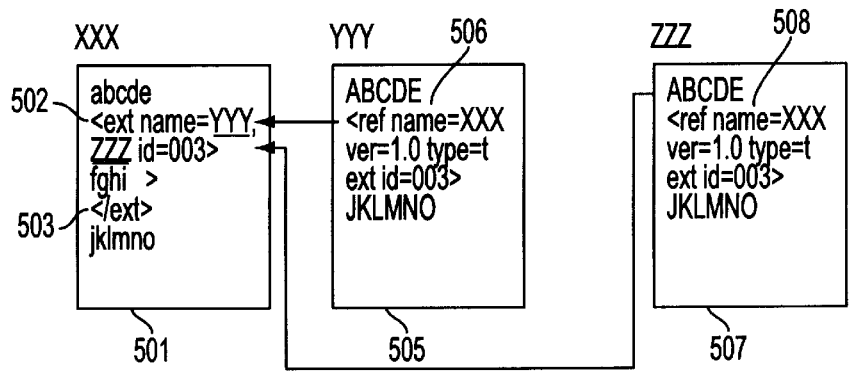
FIGS. 14a, 14b and 14c are diagrams for explaining a fifth embodiment.
Figure 14B:
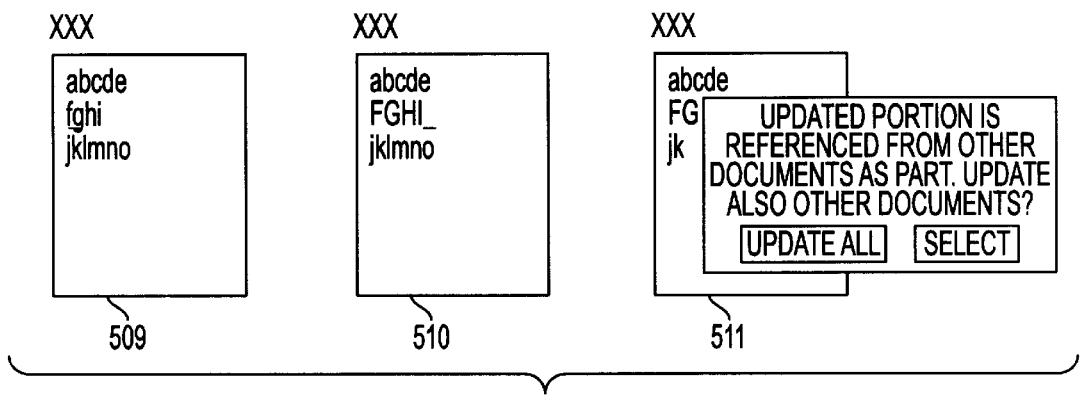
Figure 14C:
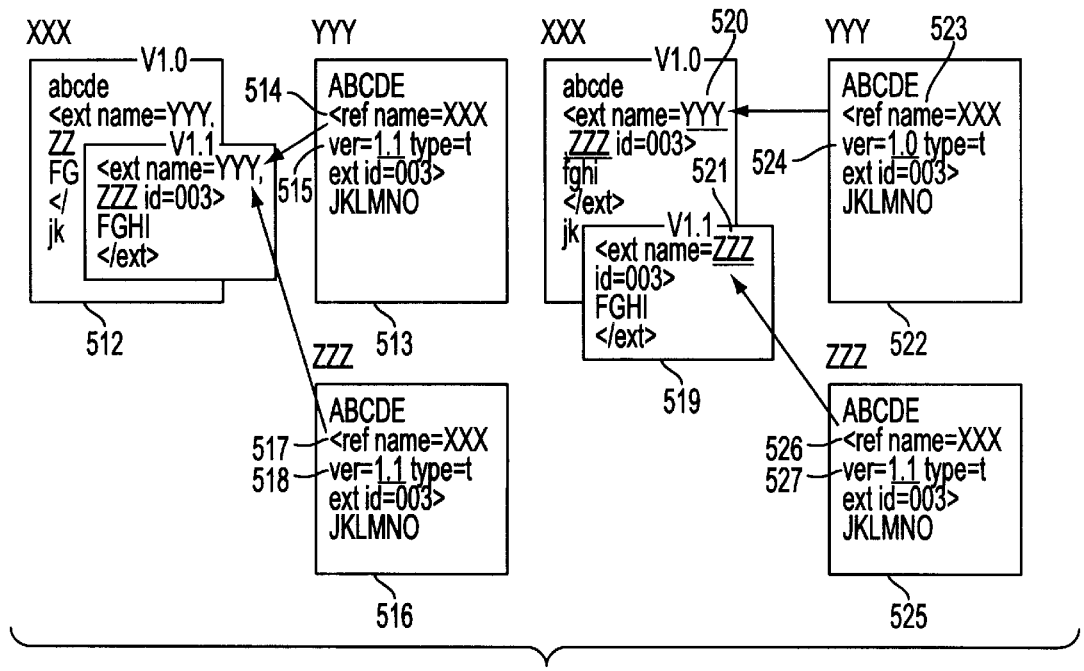

Next, a fifth embodiment will be explained with reference to FIGS. 14a, 14b and 14c. The fifth embodiment represents a case when a document YYY 505 and document ZZZ 507 are referencing an element (hereinafter referred to as a referencing part) within a document XXX 501.

When "fghi" (see 509) which is a content of the referencing document within the document XXX is changed as "FGHI" (see 510), part version number information contained in marks <ref> 506 and 508 existing within all the documents 505 and 507 which are referencing the part are all updated automatically based on the document names YYY and ZZZ 504 of the referenced document contained in the mark <ext> existing within the document XXX 501. Note that the mark <ext> indicates that the part is referenced from another document and the mark <ref> indicates that the document is referencing the part.

Here it is possible to select whether the content of the documents referencing the part should be updated per each document or not. Such selection is specified by an interactive window 511 for example.

When it is selected to update all other documents referencing the part within the document XXX 512, the part version number information ver 515 and 518 contained in the marks <ref> 514 and 517 existing within the referenced documents YYY 513 and ZZZ 516 is updated from "1.0" to "1.1" in all the referenced documents.

Next, the process when the update of the documents referencing the part within the document YYY 522 is selected per each document will be explained. Assume here that the referencing part is not updated in the referenced document YYY 522 and that it is updated in the referenced document ZZZ 525.

As for the document YYY 522, the part version number information ver 524 contained in the mark <ref> 528 is not updated and is reserved as it is, succeeding the previous version number.

On the other hand, the part version number information ver 527 contained in the mark <ref> existing within the document ZZZ 525 is updated. It allows to freely select the part before and after the update even when the referencing part is updated. At this time, names of other documents 520 and 521 in the referencing document XXX 519 may be automatically rewritten corresponding to the part version number specified in the referenced documents 420 and 423. It allows to eliminate a divergence of consistency between the document and the part which may occur when the part is updated.

Figure 15:
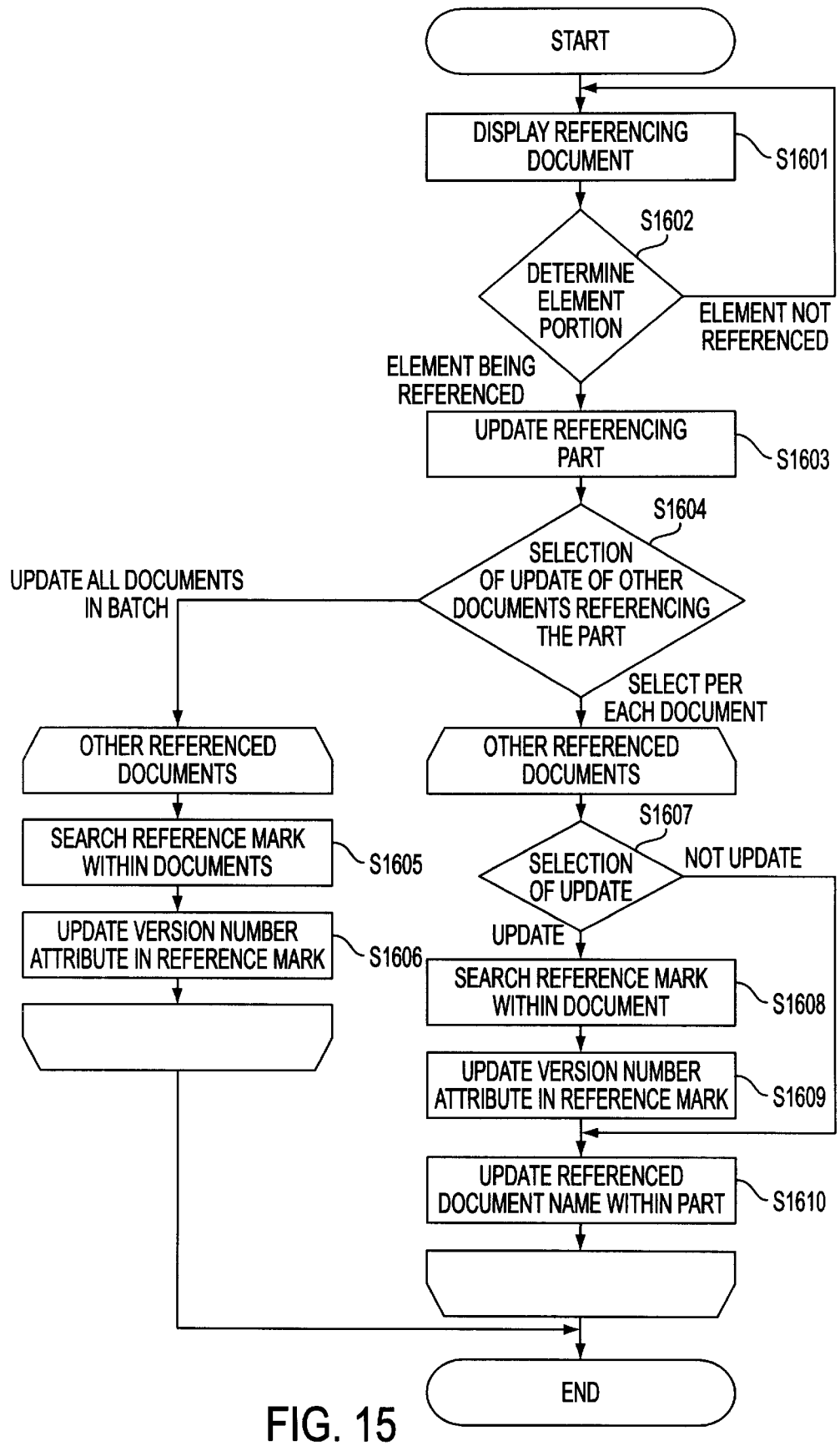
FIG. 15 is a flowchart showing a processing procedure in the fifth embodiment.

FIG. 15 is a flowchart showing the above-mentioned processing procedure. In FIG. 15, the referenced document is displayed at first (S1601). Next, it is determined whether the updated portion is the "referencing part" or "whole referenced document" (S1602). When it is determined to be the "whole referenced document" in S1602, the process returns to S1601. When it is determined to be the "referencing part" in S1602, the referencing part is updated (S1603). Then, it is determined whether the other documents referencing the referencing part should be "updated all in batch" or "updated per each document" (S1604).

When the "update all document in batch" is selected in S1604, the reference marks in other (referenced) documents are searched (S1605) covering all the other referenced documents and the version number attribute is updated (S1606). Note that the steps S1605 and S1606 are repeatedly executed.

When the "update per each document" is selected in S1604 on the other hand, it is determined whether to update or not the selected other referenced documents (S1607). When it is determined to update in S1607, the reference mark within the document is searched (S1608). Then, the version number attribute in the reference mark is updated (S1609). The referenced document name within the part is updated (SI610) when it is determined not to update in S1607 and after S1609. Note that the steps from S1607 to S1610 are repeatedly executed.

[Sixth Embodiment]

Figure 16A:
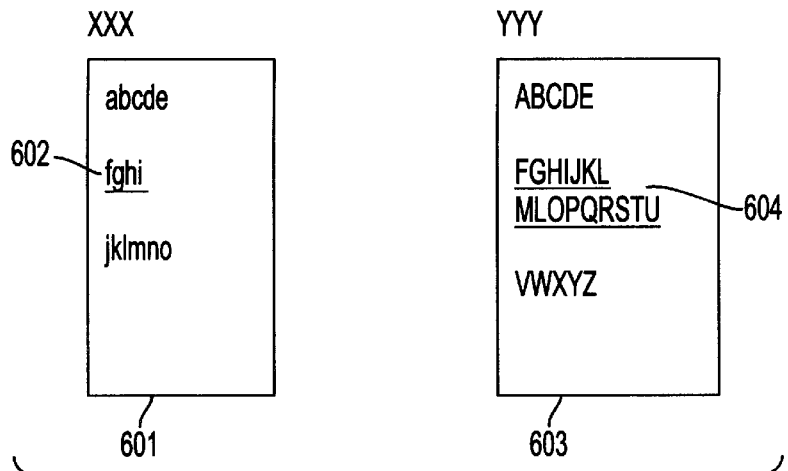
FIGS. 16a, 16b and 16c are diagrams for explaining a sixth embodiment.
Figure 16B:
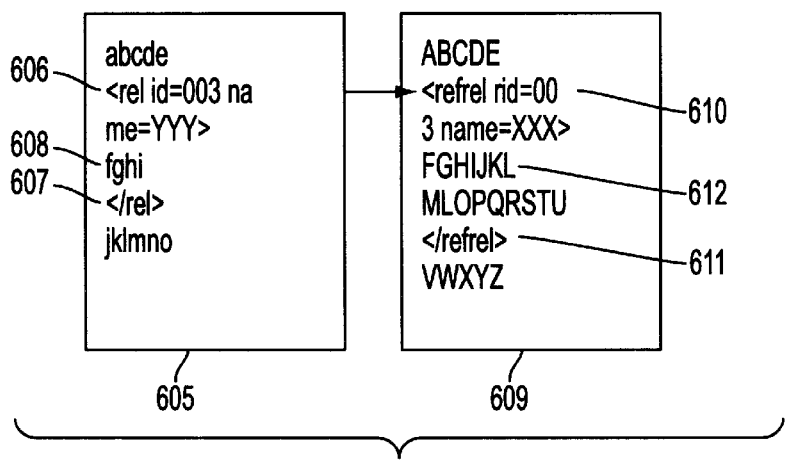
Figure 16C:
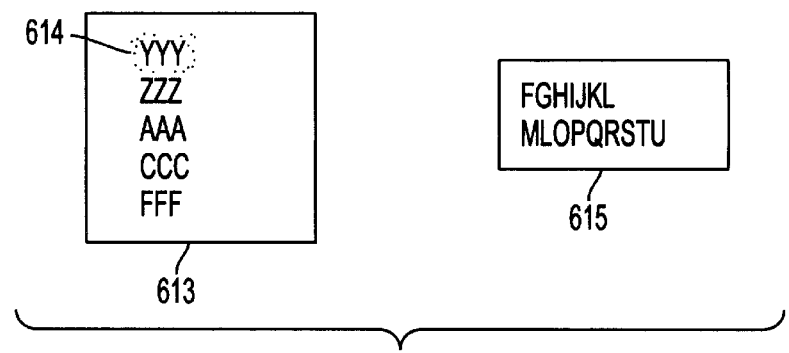

Next, a sixth embodiment will be explained with reference to FIGS. 16a, 16b and 16c. The sixth embodiment represents a case when a description related to an element 602 described within a document XXX is made also in another document YYY 603 (see 604) in setting element information mutually related among a plurality of documents (because the elements are mutually related, the content described in each document need not be totally the same).

At first, marks <rel id=003 name=YYY> 606 and </rel> 607 are added to an element 608 within a succeeded document XXX 605 to surround the before and after the range of the element. Note that the mark <ref> is a name indicating that the part is referenced, "rel" is a name indicating that an element is succeeded to another document, "id=003" is an identifier of the element and "name=YYY" is a document name of the succeeding document.

A related element 612 in the succeeding document YYY 609 is surrounded by adding marks <refrel rid=003 name= XXX> 610 and </refrel> 611 to memorize the relationship between the elements between the plurality of documents XXX and YYY. Note that "refrel" within the mark is a name indicating that the element is succeeded from another document, "rid=003" is an identifier of the mark given to the succeeded element and "name=XXX" is a document name of the succeeded document.

Figure 17:
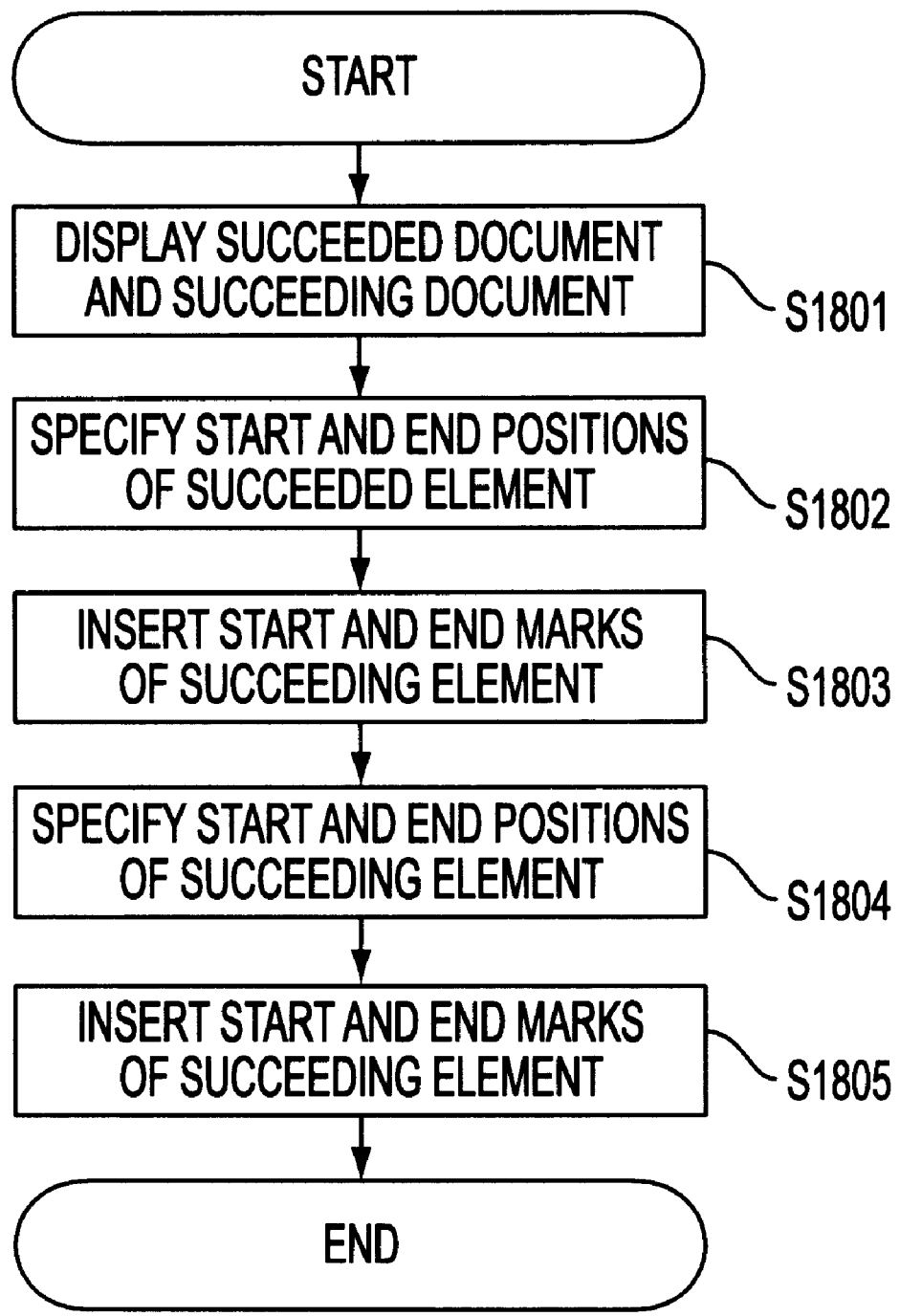
FIG. 17 is a flowchart showing a processing procedure in the sixth embodiment.

FIG. 17 is a flowchart showing the above-mentioned processing procedure. In FIG. 17, the succeeded document and succeeding document are displayed at first (S1801). Then, the start and end positions of the succeeded element are specified (S1802). Next, the start and end marks of the succeeding element are inserted (S1803). Then, the start and end positions of the succeeding element are specified (S1804). Next, the start and end marks of the succeeding element are inserted (S1805).

When the succeeded related element is referenced, the element in the displayed succeeded document XXX 605 is specified at first to select a command for displaying a succeeding document table. Then a table of document names 613 using the related element appears.

When the document name YYY 614 succeeding the related element to be referenced is selected here, the location of the succeeding document/element 612 may be traced and the content of each element 615 may be displayed from the succeeded document/element 608 based on the above information (marks added to the succeeded and succeeding document/element). Thereby the description state of the content required to describe the related element may be confirmed and a leak of description of necessary items mutually related may be prevented.

Figure 18:
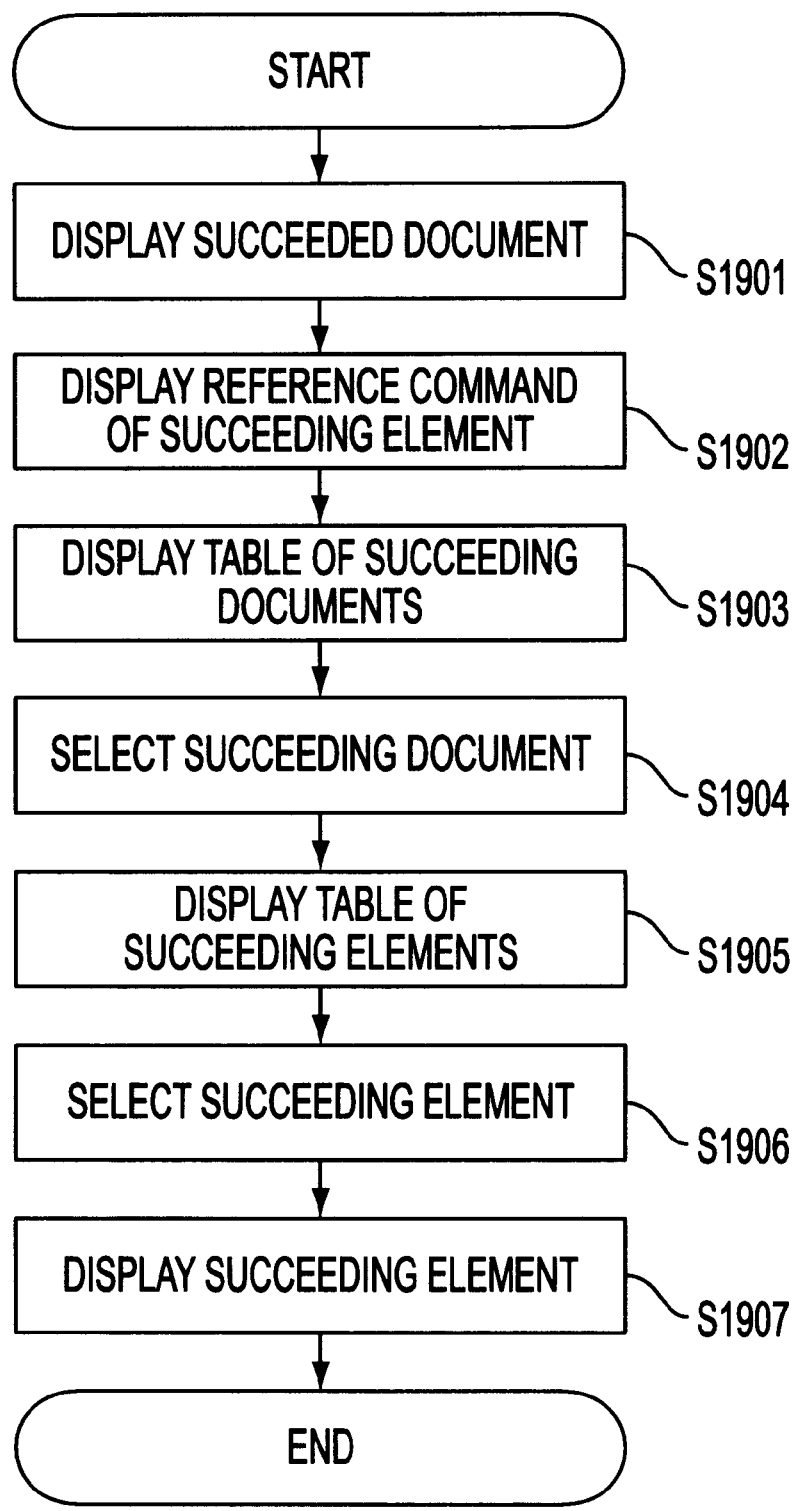
FIG. 18 is a flowchart showing a processing procedure in the sixth embodiment.

FIG. 18 is a flowchart showing the processing procedure when the content of the succeeding element is referenced. In FIG. 18, the succeeded document is displayed at first (S1901). Next, the reference command of succeeding element is selected (S1902). Then, the table of the succeeding documents is displayed (S1903). Next, the succeeding document is selected (S1904). Then, the table of succeeding elements is displayed (S1905). Next, the succeeding element is selected (S1906). Finally, the succeeding element is displayed (S1907).

[Seventh Embodiment]

A seventh embodiment will be explained with reference to FIGS. 19a through 19g. The seventh embodiment represents a case when a plurality of documents is prepared sequentially along a predetermined flow. In concrete, a document YYY is prepared from a document XXX and a document ZZZ is prepared from the document YYY. That is, the contents of those documents may be said to be related each other, wherein the document YYY is what the document XXX is detailed and the document ZZZ is what the document YYY is detailed (see FIG. 19a).

Figures 19A, 19B, 19C, 19D, 19E, 19F, 19G:
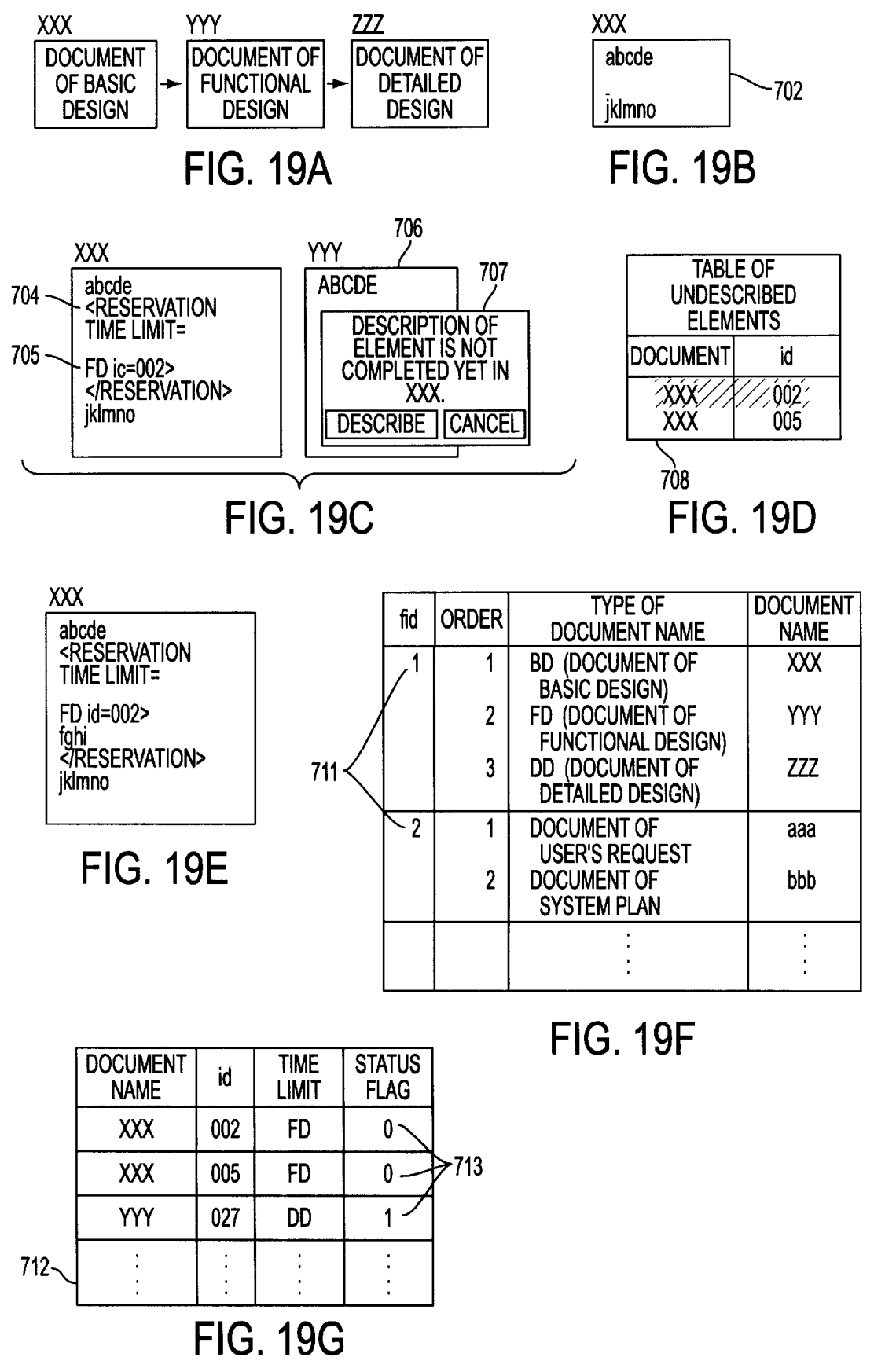

At first, information on document types prepared in a series of operations (document types such as a basic design document, functional design document and detailed design document in the above example), sequence in preparing the documents and identifier for defining the series of operation procedure is prepared beforehand as a document development process management information file 710 (see FIG. 19f). Here, information on the identifier uniquely defines the flow like the aforementioned flow id=1 and another procedure id=2 (see 711 in FIG. 19f).

When an edition of a certain document is started, it is determined to which procedure that document belongs from the document type of the document to recognize the document type prepared in that procedure and the preparation sequence.

When an element which has to be described in a document XXX 702 is temporarily reserved as shown in FIG. 19b, marks <reservation time limit=FD id=002> 704 and </reservation> 705 are inserted before and after the location where the element has to be originally described to reserve the description of the element (see FIGS. 19c and 19e).

Here, "reservation" in the mark is a name indicating that the description of the element is reserved, "id=002" is an identifier of reserved element and "time limit=FD" is a time limit as information for indicating a time when the description of the reserved element has to be completed, i.e., indicates that the description of the reserved element has to be completed before starting to prepare the document YYY prepared in the functional design (FD) process.

Furthermore, a reservation time limit management file 712 is prepared to store names of documents wherein reserved elements to be solved by a specified time limit exist, identifiers of the reserved elements, time limits indicating the time when the description of the reserved elements has to be completed and status flags indicating reserved statuses (1: already solved, 0: not solved yet).

Figure 20:
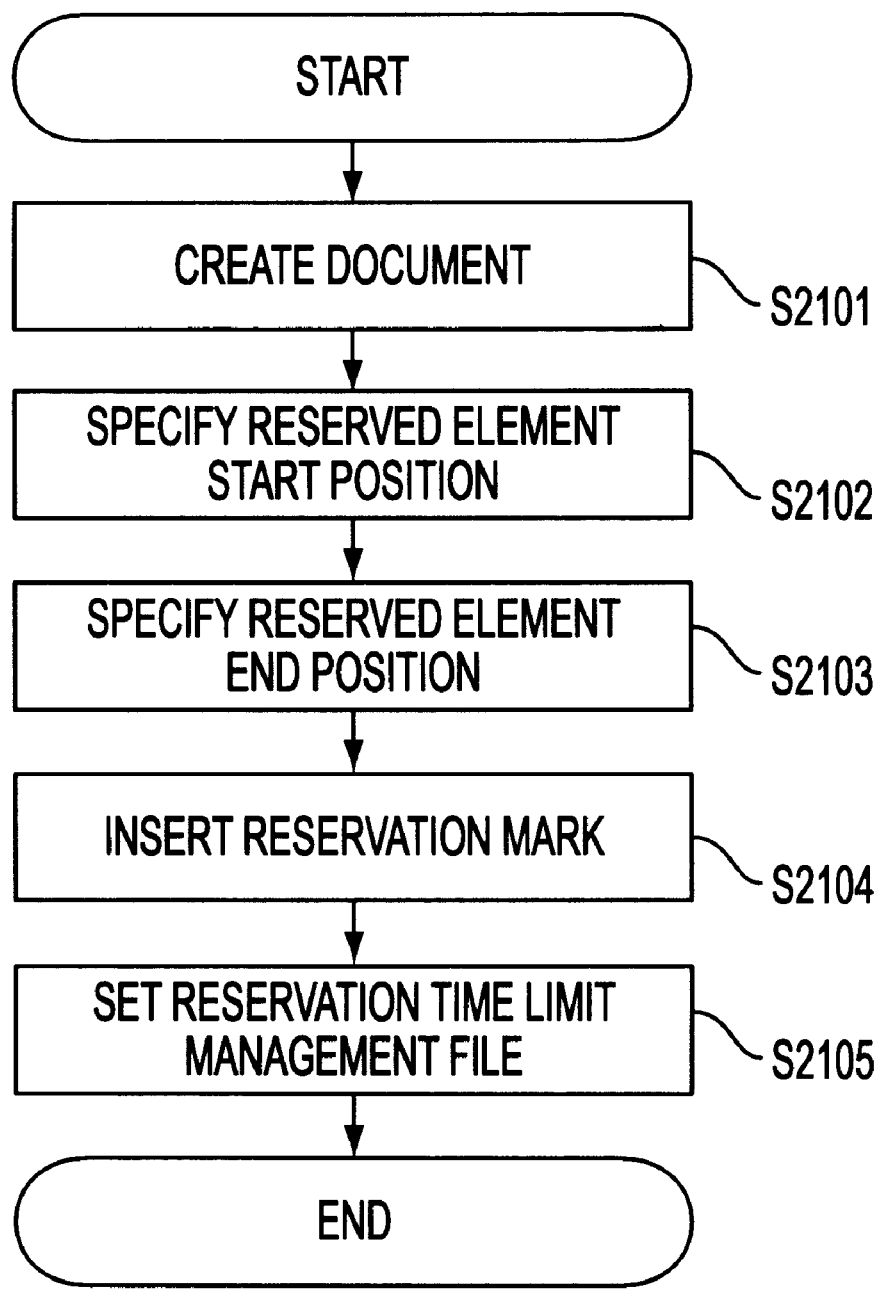
FIG. 20 is a flowchart showing a processing procedure in the seventh embodiment.

FIG. 20 is a flowchart showing the processing procedure when the reservation of the element is set as described above. In FIG. 20, the document is prepared at first (S2101). Next, the reserved element start position is specified (S2102) and the reserved element end position is specified (S2103). Then, the reservation mark is inserted (S2104) and finally, the reservation time limit management file is set (S2105).

Note that when the document YYY 706 (see FIG. 19c) in a certain process is to be prepared, the type of the document is discriminated at the time when it is selected to prepare the document to automatically check whether the document is specified in the time limit of the reservation time limit management file. Although the document YYY may be prepared as it is when it is not specified, it is confirmed whether the description of the element reserved within the document XXX has been completed by a status flag 713 (FIG. 19g) within the reservation time limit management file 712 (see FIG. 19g) when the process is specified as the reservation time limit. Then, the preparation of the document YYY may he started if there is no reserved element.

However, when there exists a reserved element, a warning 707 indicating that a reserved element has to be described and a table of undescribed elements 708 (FIG. 19d) are displayed and a corresponding part of the document 706 containing each element is displayed in an editable manner to urge to describe describable elements. Thereby, description of element; to be described within the document is prevented from leaking by disabling to advance to the next operation if there exists a reserved element not described until the time limit.

Figure 21:
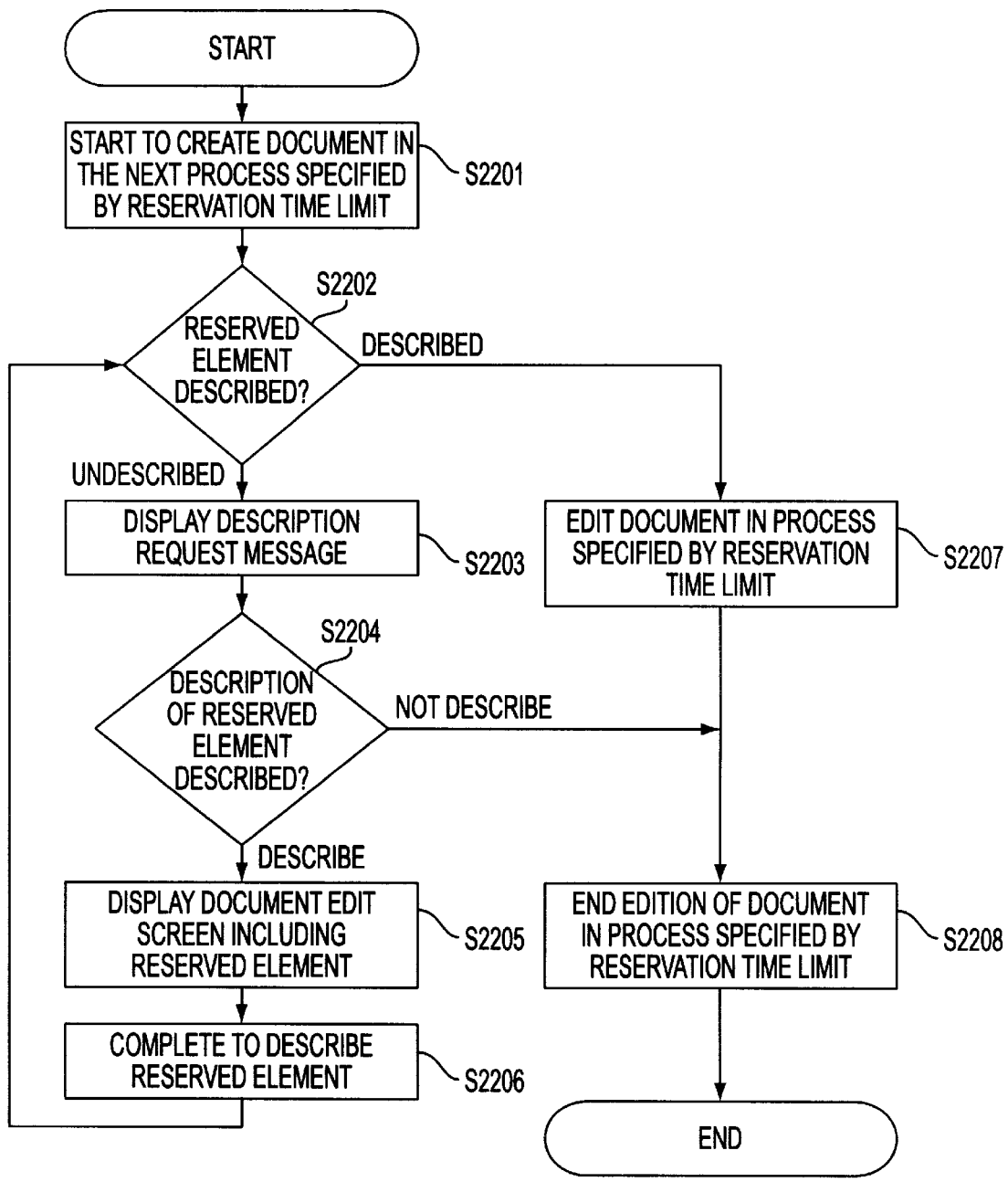
FIG. 21 is a flowchart showing a processing procedure in the seventh embodiment.

FIG. 21 is a flowchart showing the processing procedure in pointing out a leak of description of reserved element and completing the description of the reserved element. As shown in FIG. 21, the preparation of the document in the next process which is specified by the reservation time limit is started at first (S2201). Next, it is determined whether the description state of the reserved element is "undescribed" or "already described" (S2202). When it is determined to be "undescribed" in step S2202, a description requesting message is displayed (S2203). Next, it is determined whether the reserved element is "described" or "not described" (S2204). When it is determined to "describe" in step S2204, an edit screen of the document containing the reserved element is displayed (S2205). Then, the description of the reserved element is completed (S2206) and the process returns to step S2202.

When it is determined to be "already described" in step S2202, the document of the process specified by the reservation time limit is edited (S2207). The edition of the document of the process specified by the reservation time limit is finished after step S2207 and when it is determined "not to describe" in step S2204 (S2208).

[Eighth Embodiment]

Figure 22:
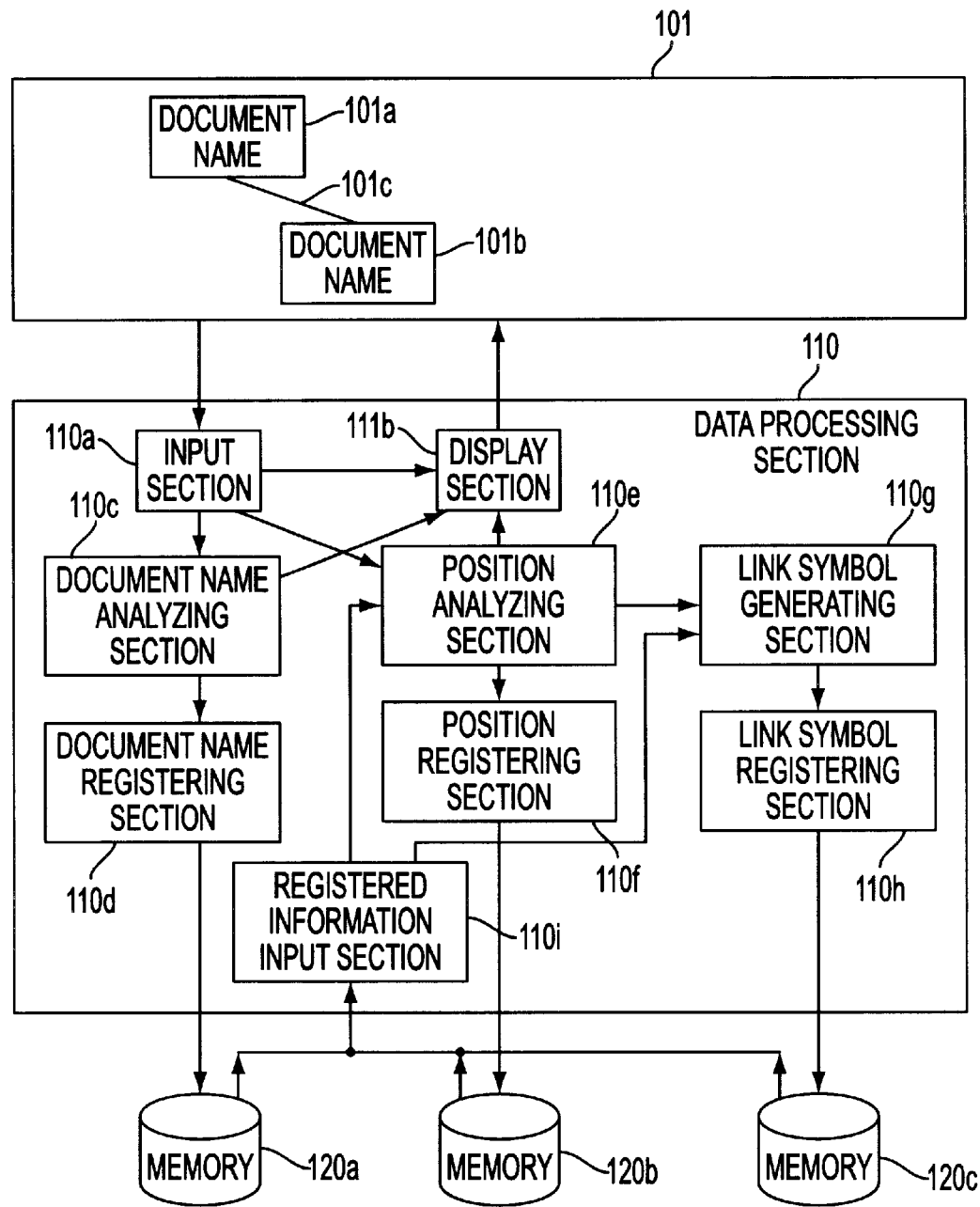
FIG. 22 is a functional block diagram showing an eighth embodiment.
Figure 23:
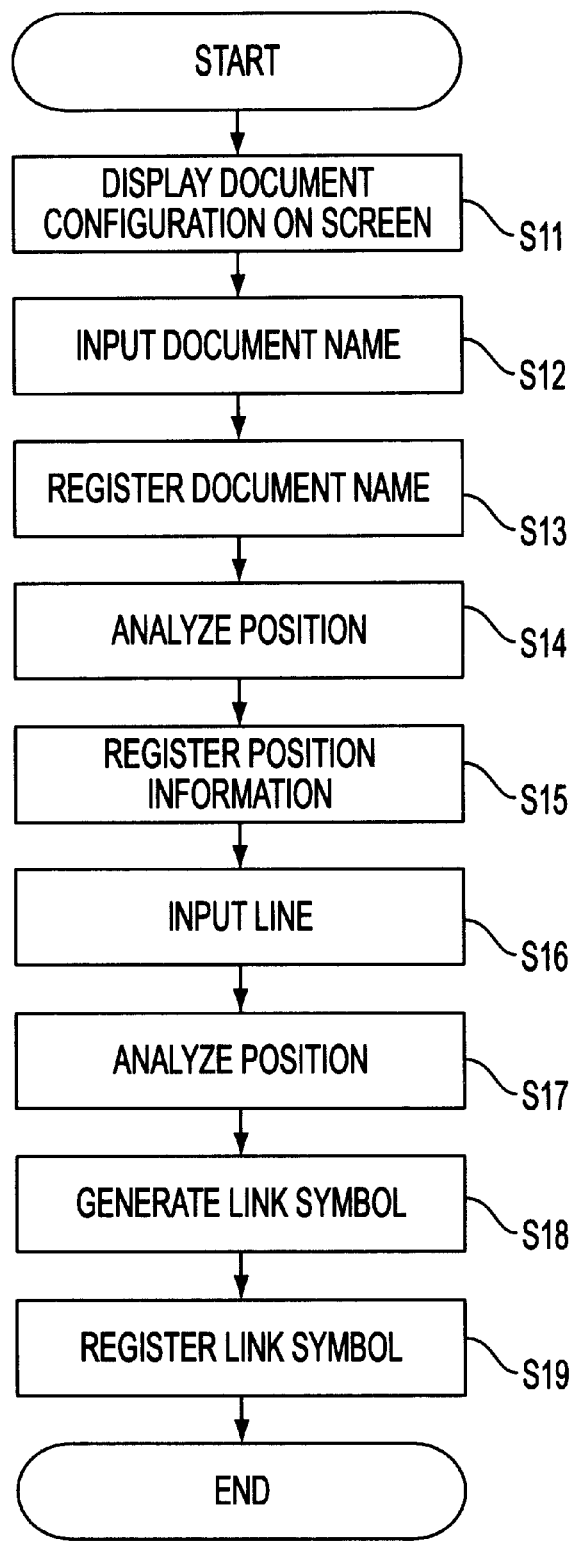
FIG. 23 is a flowchart showing a processing procedure in the eighth embodiment.

FIG. 22 is a block diagram showing a circuit configuration and information processing procedure in an eight embodiment of the present invention and FIG. 23 is a flowchart showing the processing procedure in FIG. 22.

In FIG. 22, the reference numeral 101 denotes a screen by which the user inputs document names 101a and 101b for example as design information for composing a document.

Note that the reference numeral 110 is a data processing section containing input section 110a through registered information input section 110i for processing data displayed on the screen 101.

The input section 110a accepts information input by the user on the screen 101, a display section 110b displays document configuration in accordance to the information input by the user, a document name analyzing section 101c takes out a document name to be registered, a document registering section 110*d* registers the document name input by the user, a position analyzing section 110*e* analyzes position information of the document configuration, a position registering section 110*f* registers position of the document analyzed by the position analyzing section 110*e* corresponding to the document name, a link symbol generating section 110*g* gives a unique link symbol to a link line 101*c* linking the frames of the document names 101*a* and 101*b* on the screen 101, a link symbol generating section 110*h* registers the link symbol generated by the link symbol generating section 110*g* corresponding to the document name, and a registered information input section 110*i* inputs a registered document name, position information and link symbol information.

The reference numerals 120*a* through 120*c* are memories, wherein the memory 120*a* temporarily stores the document name registered by the document name registering section 110*d*, memory 120*b* temporarily stores the position information registered by the position registering section 110*f* corresponding to the document name and memory 120*c* temporarily stores the link symbol registered by the link symbol registering section 110*h* and two corresponding document names (e.g., document names 101*a* and 101*b*).

Note that in FIG. 23, S (e.g., S11) indicates a processing step. Processing steps are similarly described also in FIGS. 25, 27, 29, 31 and 33**.

Now the operation will be explained in the order of the processing procedure with reference to FIGS. 22 and 23.

S11: When the processing is started, the user displays the screen 101 on the display section 110*b* in order to input a document configuration.

S12: Input data (???????) and document name (???????) are input to the screen 101 from the input section 110*a* and the document name described by the user to the screen 101 is analyzed by the document name analyzing section 110*c* from the input data.

S13: The document name analyzed by the document name analyzing section 110*c* is registered to the memory 120*a* by the document name registering section 110*d*.

S14: Input data to the screen 101 is input by the input section 110*a* and position of a frame surrounding the document name described by the user to the screen 101 is analyzed by the position analyzing section 110*e* from the input data.

S15: The position information analyzed by the position analyzing section 110*e* is registered to the memory 120*b* by the position registering section 110*f* in correspondence with the document name analyzed by the document name analyzing section 100*c*.

S16: Input data (the link line 101*c* for correlating two documents) is line-input to the screen 101 by the input section 110*a*.

S17: Position of the input data (link line 101*c*) input by the input section 110*a* is analyzed by a position analyzing section 10E.

S18: Two document names 101*a* and 101*b* corresponding to the position information analyzed by the position analyzing section 110*e* are read into the position analyzing section 10E from the data of the memories 120*a*, 120*b* and 120*c* via the registered information input section 110 and a link symbol corresponding to that is generated in the link symbol generating section 110*g*.

S19: The link symbol generated by the link symbol generating section 110*g* is registered in the memory 120*c* by the link symbol registering section 110*h* in correspondence with the two document names 101*a* and 101*b*.

[Ninth Embodiment]

Figure 24:
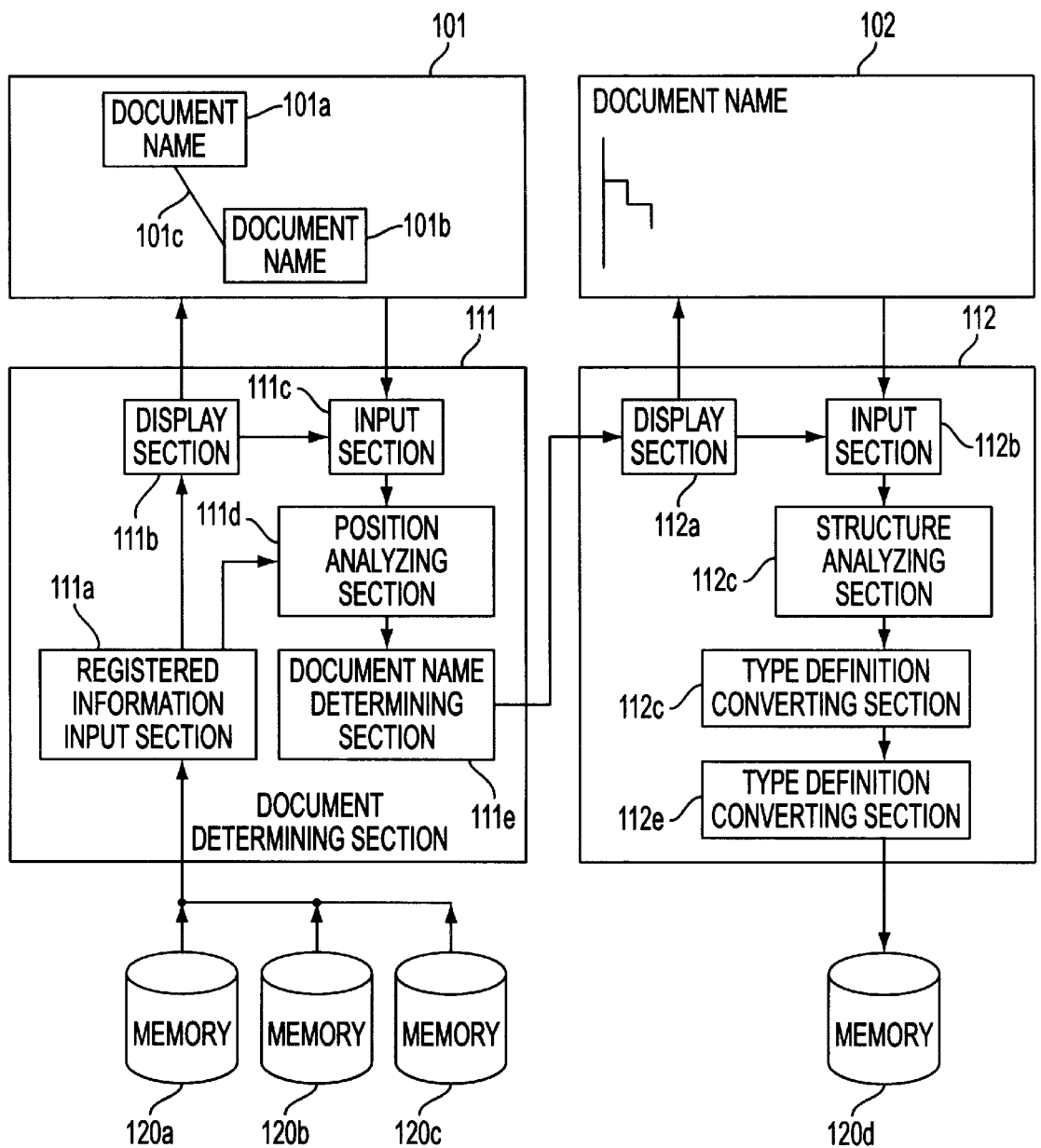
FIG. 24 is a functional block diagram showing a ninth embodiment.
Figure 25:
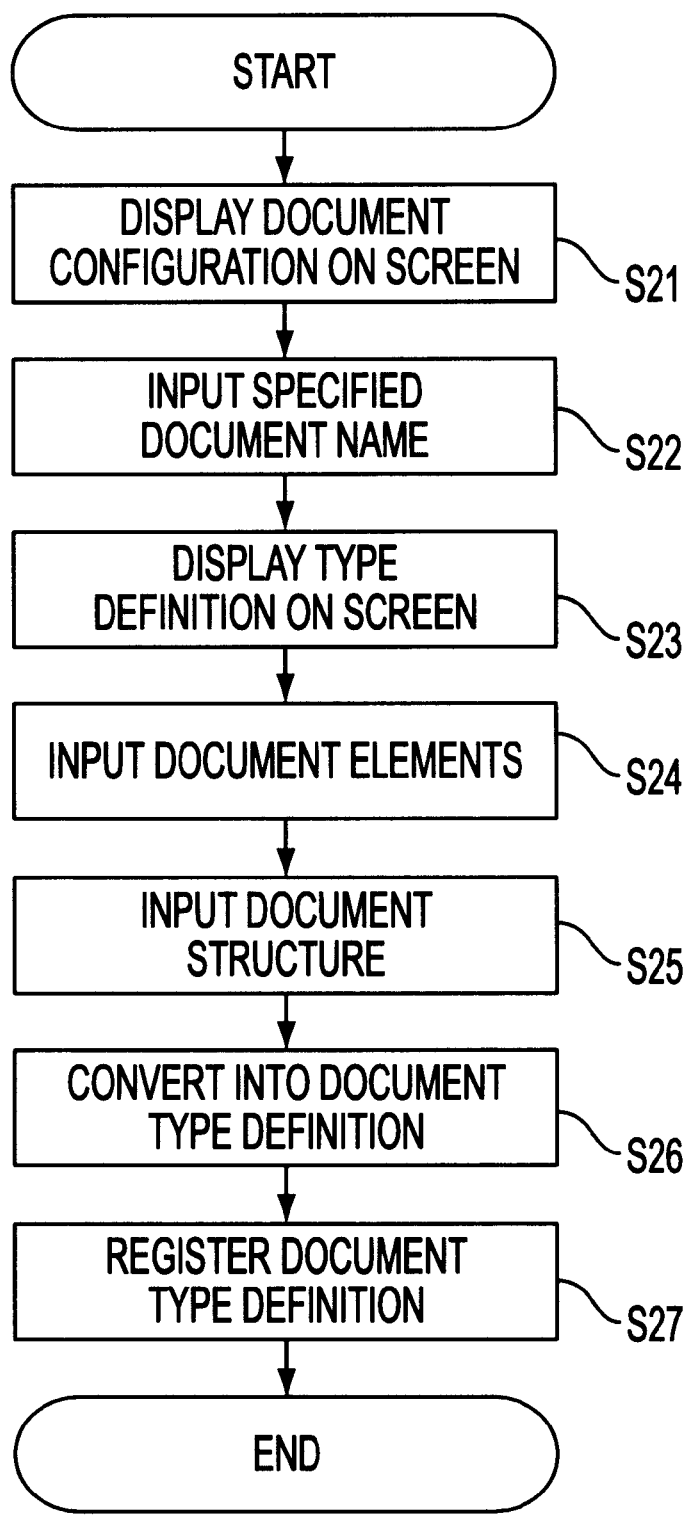
FIG. 25 is a flowchart showing a processing procedure in the ninth embodiment.

FIG. 24 is a block diagram showing a circuit configuration and information processing procedure in a ninth embodiment of the present invention and FIG. 25 is a flowchart showing the processing procedure in FIG. 24.

In FIG. 24, the reference numerals 101 and 102 denote screens, wherein the screen 101 is used by the user to select the document names 101*a* and 101*b* to perform document type definition and the screen 102 is used by the user to perform the document type definition.

The reference numeral 111 denotes a document determining section containing circuit regions 111*a* through 111*e*, wherein a registered information input section 111*a* inputs registered document name, position information and link symbol information, a display section 111*b* displays the registered document name, position information and link symbol information, an input section 111*c* inputs a position specified by the user, a position analyzing section 111*d* analyzes the position specified by the user, and a document name determining section 111*e* determines a document name for which document type definition is made from the position information analyzed by the position analyzing section 111*d*.

The reference numeral 112 denotes a type definition creating section containing circuit regions 112*a* through 112*e*, wherein a display section 112*a* displays the screen 102 for document type definition, an input section 112*b* accepts information input by the user on the screen 102, a structure analyzing section 112*c* analyzes a document structure following to a certain rule from the information input on the screen 102, a type definition converting section 112*d* converts a document type definition from a result of the structure analyzing section 112*c*, and a type definition registering section 112*e* registers a created document type definition to a memory 120*d*.

The reference numerals 120*a* through 120*c* are the memories same with those in FIG. 22 and the memory 120*d* temporarily stores the document type definition registered by the type definition registering section 112*e*.

The operation will be explained with reference to FIGS. 24 and 25 in the order of the processing procedure.

S21: When the processing is started, the user reads data in the memories 120*a*, 120*b* and 120*c* by the registered information input section 111*a* and displays the document configuration (document names 101*a* and 101*b* and link line 101*c*) by the display section 111*b* on the screens 101 and 102 to specify document names.

S22: Input data (document names 101*a* and 101*b* specified by the user) is input to the screen 101 by the input section 111*c*, positions of frames surrounding the screen 101*a* and 101*b* specified by the user are analyzed by the position analyzing section 111*d* from the input data and data in the memories 120*a*, 120*b* and 120*c* read via the registered information input section 111*a* and the screen 101*a* and 101*b* specified by the user are determined by the document name determining section 111*e*.

S23: The screen 102 corresponding to the document names 101*a* and 101*b* determined by the document name determining section 111*e*, i.e., the screen for the document type definition is displayed by the display section 112*a*.

S24: Input, data to the screen 102, i.e., document elements (hierarchical description of document element names), is input by the input section 112*b*.

S25: Input data to the screen 102, i.e., document structure (lines connecting between document element names) is input by the input section 112b.

S26: The document elements and document structure input by the input section 112b are analyzed by the structure analyzing section 112c and are converted to document type definition by the type definition converting section 112d.

S27: The document type definition converted by the type definition converting section 112d is registered to the memory 120d by the type definition registering section 112e.

[Tenth Embodiment]

Figure 26:
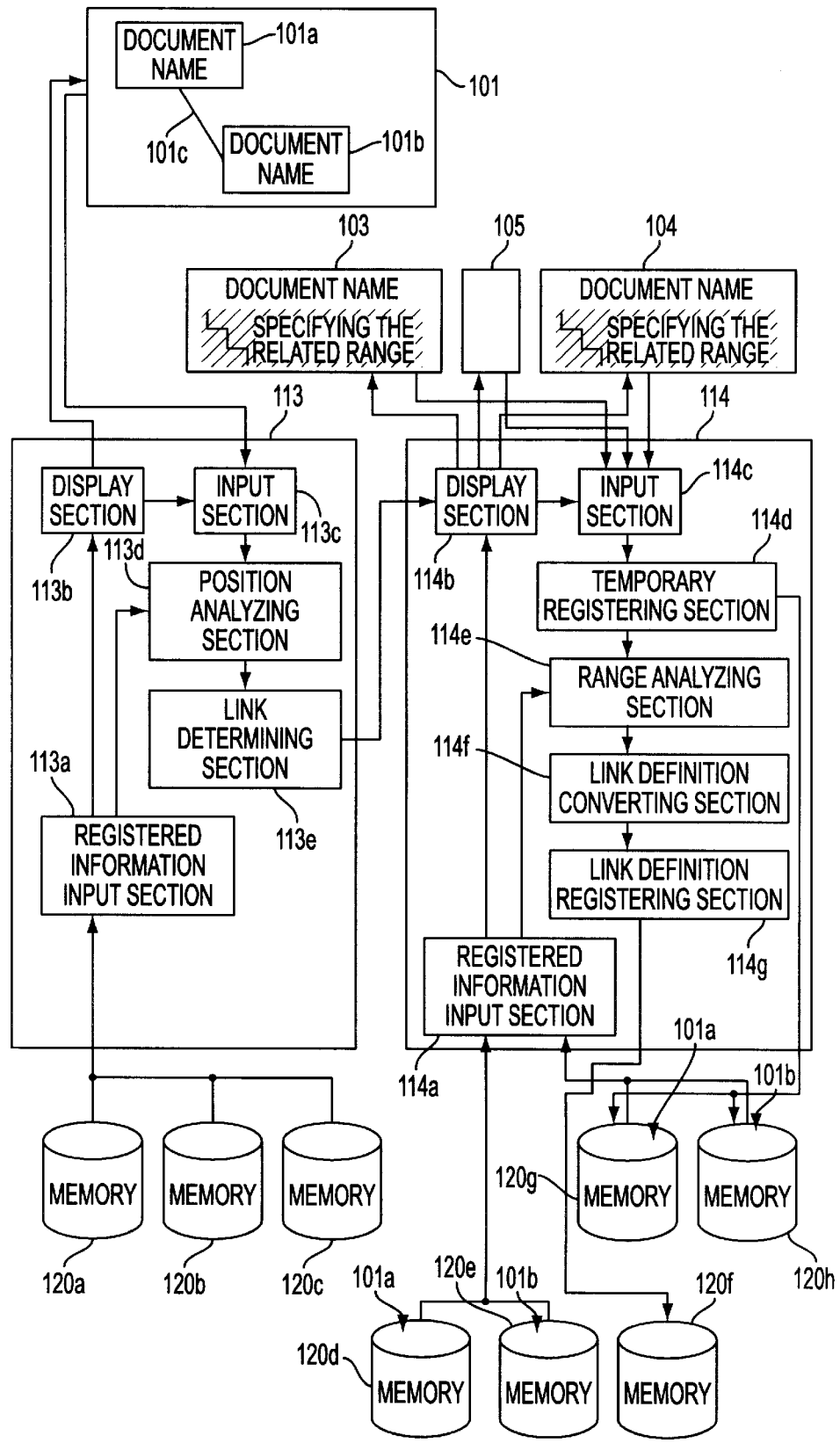
FIG. 26 is a functional block diagram showing a tenth embodiment.
Figure 27:
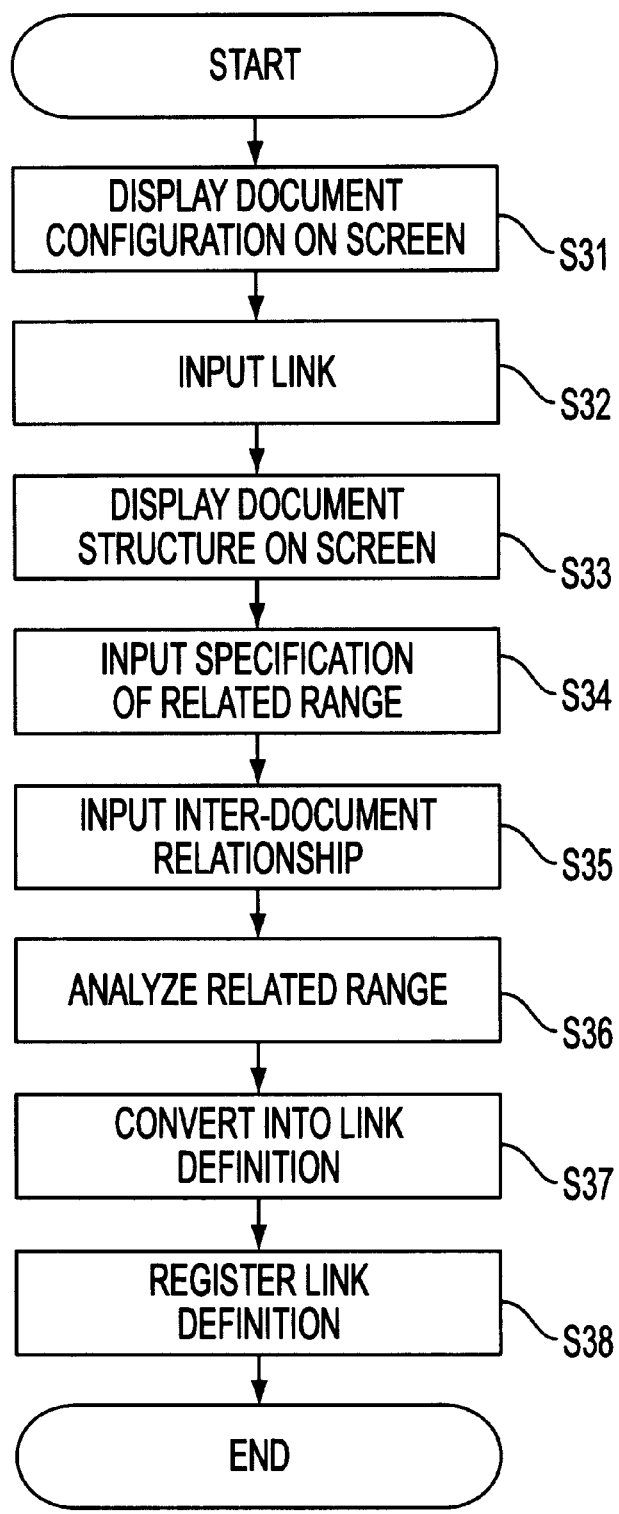
FIG. 27 is a flowchart showing a processing procedure in the tenth embodiment.

FIG. 26 is a block diagram showing a circuit configuration and information processing procedure in a tenth embodiment of the present invention and FIG. 27 is a flowchart showing the processing procedure in FIG. 26.

In FIG. 26, the reference numerals 101, 103, 104 and 105 are screens, wherein the screen 101 (the same with that in FIG. 22) displays a document configuration and is used by the user to select the link line 101c to perform link definition, the screen 103 displays a document type and specifies a related range (hatched portion) of one document, the screen 104 displays a document type and specifies a related range (halftone portion) of another document corresponding to the screen 103 and the screen 105 is a screen for inputting a type of inter-document relationship and relationship of the link line 10c.

The reference numeral 113 denotes a relation determining section containing circuit regions 113a through 113e, wherein a registered information input section 113a inputs registered document name, position information and link symbol information, a display section 113b displays a document configuration from the registered document name, position information and link symbol information, a data input section 113c inputs a position specified by the user, a position analyzing section 113d analyzes the position specified by the user and link determining section 113e determines the 101c for creating link definition.

The reference numeral 114 denotes a link definition creating section containing circuit regions 114a through 114e, wherein a registered information input section 114a inputs temporary registered information on a related range between registered document type definition and document, a display section 114b displays document type screens of the screens 103 and 104 and screens of input of type of inter-document relationship of the screen 105, a input section 114 inputs the inter-document related range and type of inter-document relationship, a temporary registering section 114d temporarily registers information on the inter-document related range input on the screens 103 and 104, a range analyzing section 114e analyzes that to which portion of the document type definition the inter-document related range specified by the user corresponds, a link definition converting section 114f creates link conversion of the link line 101c from the analyzed result of the range analyzing section 114e and a link definition registering section 114g registers the link definition of the link line 101c to a memory 120f.

The reference numerals 120a through 120e are memories same with those in FIGS. 22 and 24 and the memory 120f temporarily stores information on the link definition registered by the link definition registering section 114g. Memories 120g and 120h temporarily stores information on the inter-document related range registered by the temporary registering section 114d.

The operation will be explained with reference to FIGS. 26 and 27 in the order of the processing procedure.

S31: When the processing is started, the user reads in data in the memories 120a through 120c by the registered information input section 113a and displays a document configuration on the screen 101 by the display section 113d to specify the link line 101c.

S32: The link line 101c is link-input to the screen 101 by the input section 113c, a position of the link lane 101c for correlating two documents 101a and 101b specified by the user is analyzed by the position analyzing section 113d from the input data and the data in the memories 120a through 120c read via the registered information input section 113a and a link symbol which corresponds to the link line 101c specified by the user is determined by the link determining section 113e.

S33: A document type definition which corresponds to the two document names 101a and 101b which correspond to the link symbol determined by the link determining section 103e is read from the data in the memories 120d and 120e by the registered information input section 114a to display on the screens 103 and 104 for showing document type by the display section 114b to allow the user to specify the related range between the documents.

S34: The input data (related range between the documents) on the screens 103 and 104 is input by the input section 114c and is temporarily registered in the memories 120q and 120h by the temporary registering section 114d.

S35: The user displays the screen 105 by the display section 114b to input the type of relationship between the documents and inputs input data and the screens 103 and 104 to the screen 105 by the input section 114c.

S36: The data in the memory 120d (document type definition of the document 101a), memory 120e (type definition between documents of the document 101b), memory 120g (inter-document related range of the document 101a) and memory 120h (inter-document related range of the document 101b) are read via the registered information input section 114a and the related range between the document in the screens 103 and 104 is analyzed by the range analyzing section 114e.

S37: The link definition is converted by the link definition converting section 114f from the result analyzed by the range analyzing section 114e and the input data to the screen 105.

S38: The link definition created by the link definition converting section 114f is registered in the memory 120f by the link definition registering section 114g.

[Eleventh Embodiment]

Figure 28:
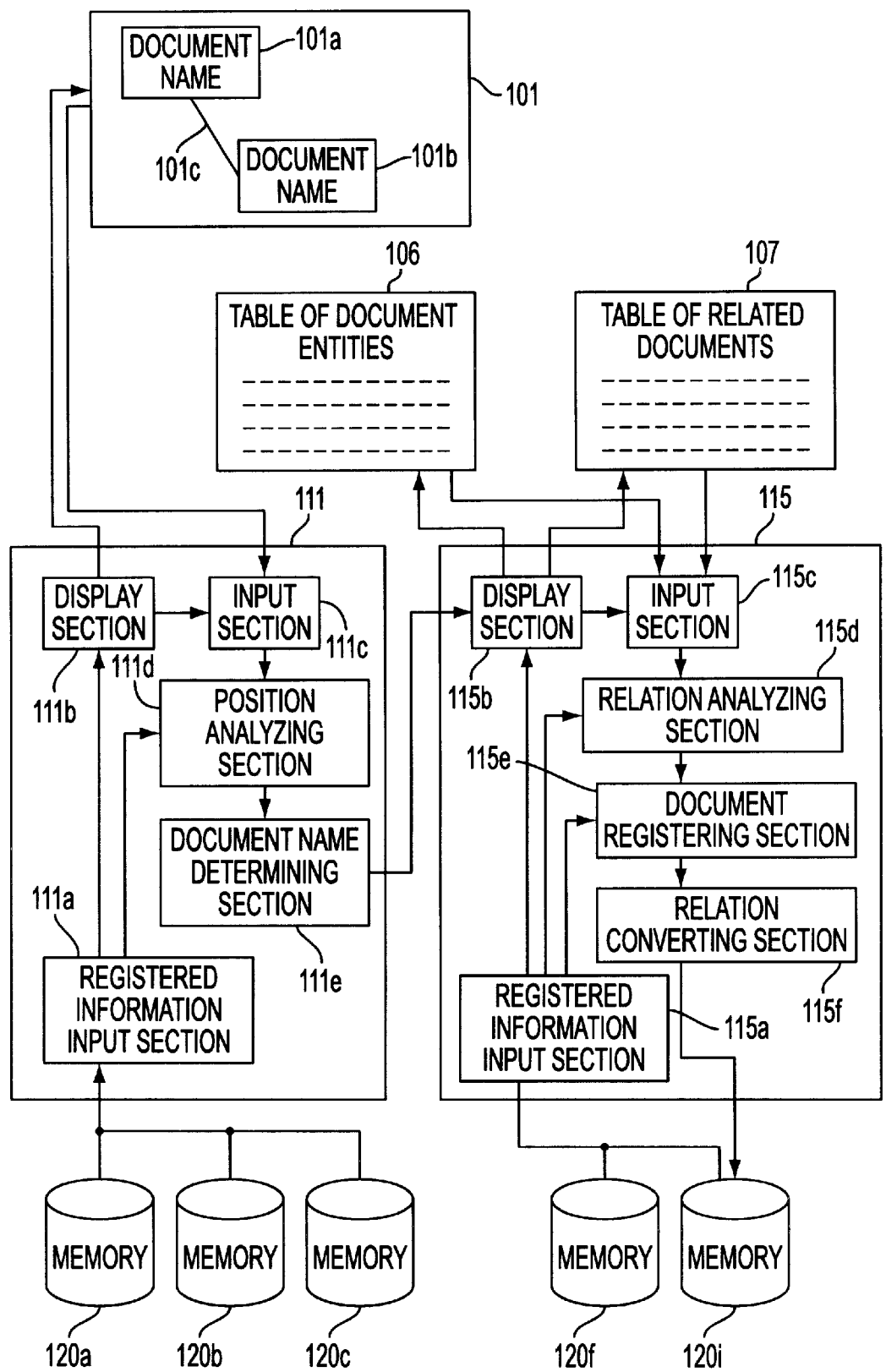
FIG. 28 is a functional block diagram showing an eleventh embodiment.
Figure 29:
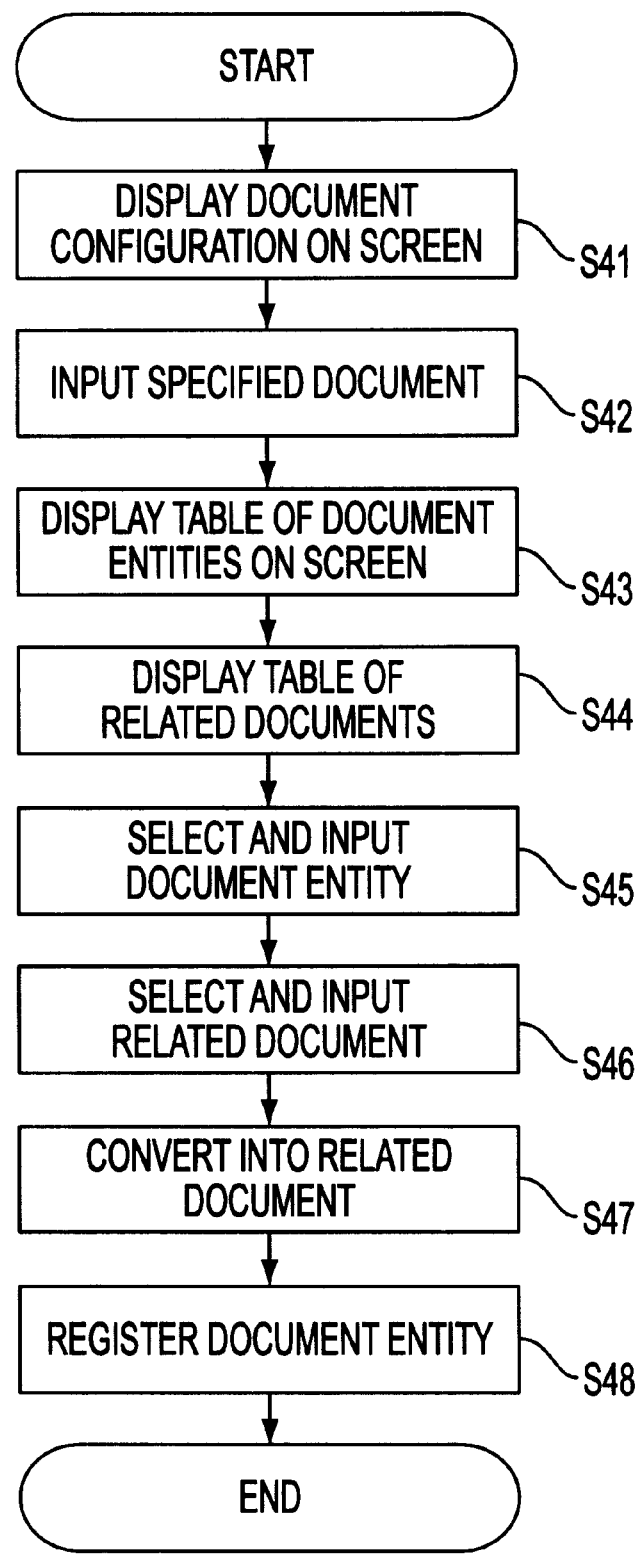
FIG. 29 is a flowchart showing a processing procedure in the eleventh embodiment.

FIG. 28 is a block diagram showing a circuit configuration and information processing procedure in an eleventh embodiment of the present invention and FIG. 29 is a flowchart showing the processing procedure in FIG. 28.

In FIG. 28, the reference numerals 101, 106 and 107 denote screens, wherein the screen 101 (the same with that in FIG. 22) is a screen for displaying a document configuration and for selecting document names 101a and 110b to be converted, the screen 106 is a selective screen of a document entity table for selecting an entity of a document to be converted and the screen 107 is a selective screen of a related document table for selecting a related document used by the user for conversion from documents related by link definition with the document selected on the screen 101.

The reference numeral 111 denotes a document determining section which is configured in the same manner with that shown in FIG. 24. The reference numeral 115 denotes a document converting section containing circuit regions 115a through 115f, wherein a registered information input section 115a inputs registered link definition and entity of document, a display section 115b displays the selective screen of the document entity table of the screen 101 and the selective screen of the related document table of the screen 102, an input section 115c accepts information input by the user on the screens 106 and 107, a relation analyzing section 115d analyzes a portion of document to be converted from the link definition, a relation converting section 115e converts the document entity from an analyzed result of the relation analyzing section 115d, and a document registering section 115f registers the entity of document after the conversion to a memory 120i.

The operation will be explained with reference to FIGS. 28 and 29 in the order of the processing procedure.

S41: When the processing is started, the user inputs the data in the memories 120a through 120c by the registered information input section 111a to display a document configuration by the display section 111b on the screen 101 to specify the document names 101a and 101b.

S42: Input data (specified documents 101a and 101b) is input to the screen 101 by the input section 111c, positions of frames surrounding the document names 101a and 101b specified by the user are analyzed from the input data and the data of the memories 120a through 120c input via the registered information input section 111a, and the document names 101a and 101b specified by the user are determined by the document name determining section 111e.

S43: The document entity table which corresponds to the document names 101a and 101b determined by the document name determining section 111e is read from the memory 120i via the registered information input section 115a to display on the screen.

S44: The document name correlated with the link definition to the document entity table determined by the document name determining section 111e is read from the data in the memory 120f via the registered information input section 115a to display on the screen 107 as the related document table by the display section 115b.

S45: Input data to the screen 106 (document entity name to be converted by the user) is selected and input by the input section 115c.

S46: Input data to the screen 107 (related document name at the destination of conversion of the document entity selected by the user on the screen 106) is selected and input by the input section 115c.

S47: The document entity selected by the user on the screen 106 and the link definition corresponding to the related document selected on the screen 107 are read from the data in the memory 120 (link definition) and memory 120i (document entity) via the registered information input section 115a, the converted portion is analyzed by the relation analyzing section 115d and the document entity selected by the user on the screen 106 is converted into the related document selected on the screen 107 by the relation converting section 115e to create a new document.

S48: The related document created by the relation converting section 115e is registered to the memory 120i by the document registering section 115f.

[Twelfth Embodiment]

Figure 30:
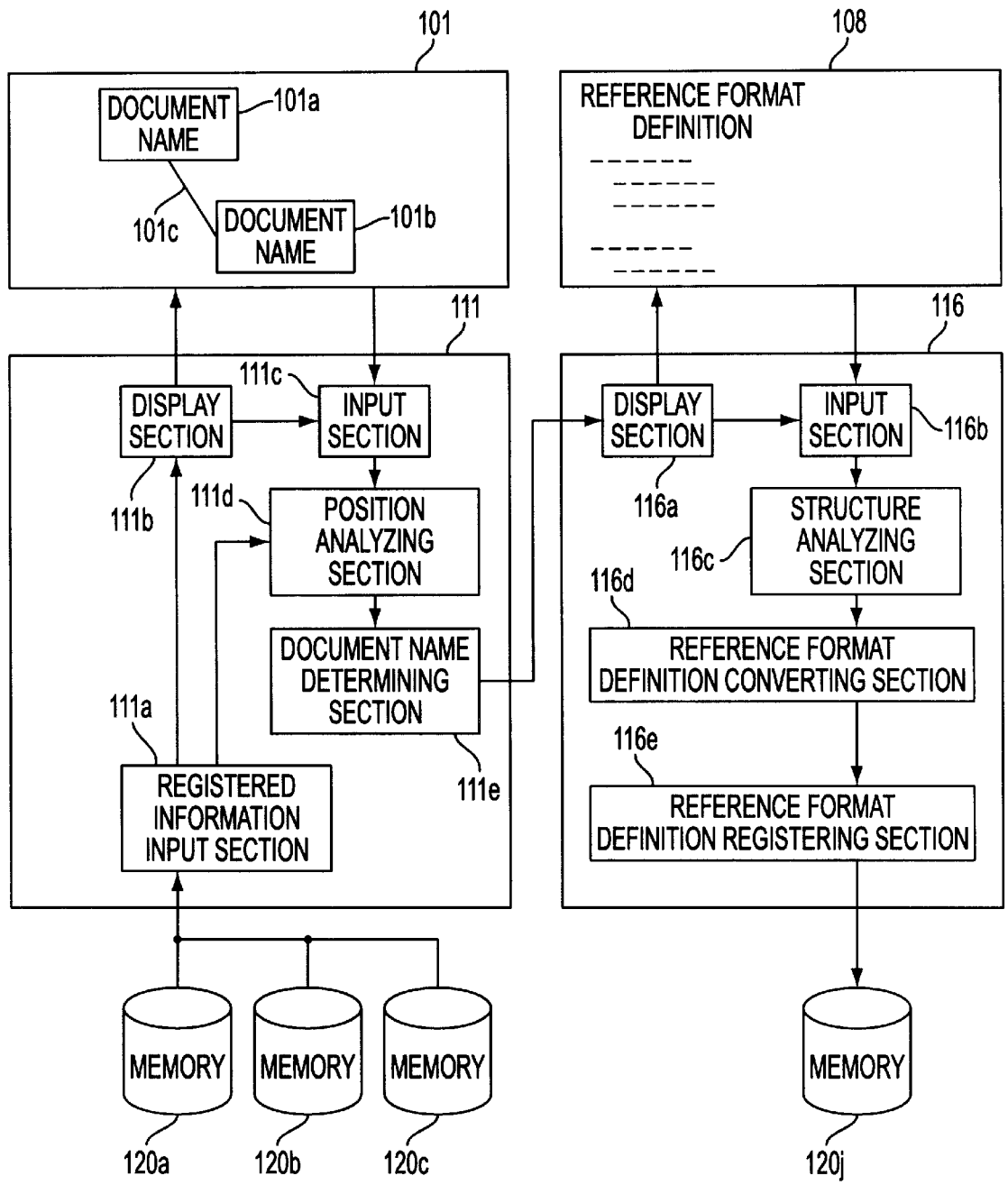
FIG. 30 is a functional block diagram showing a twelfth embodiment.
Figure 31:
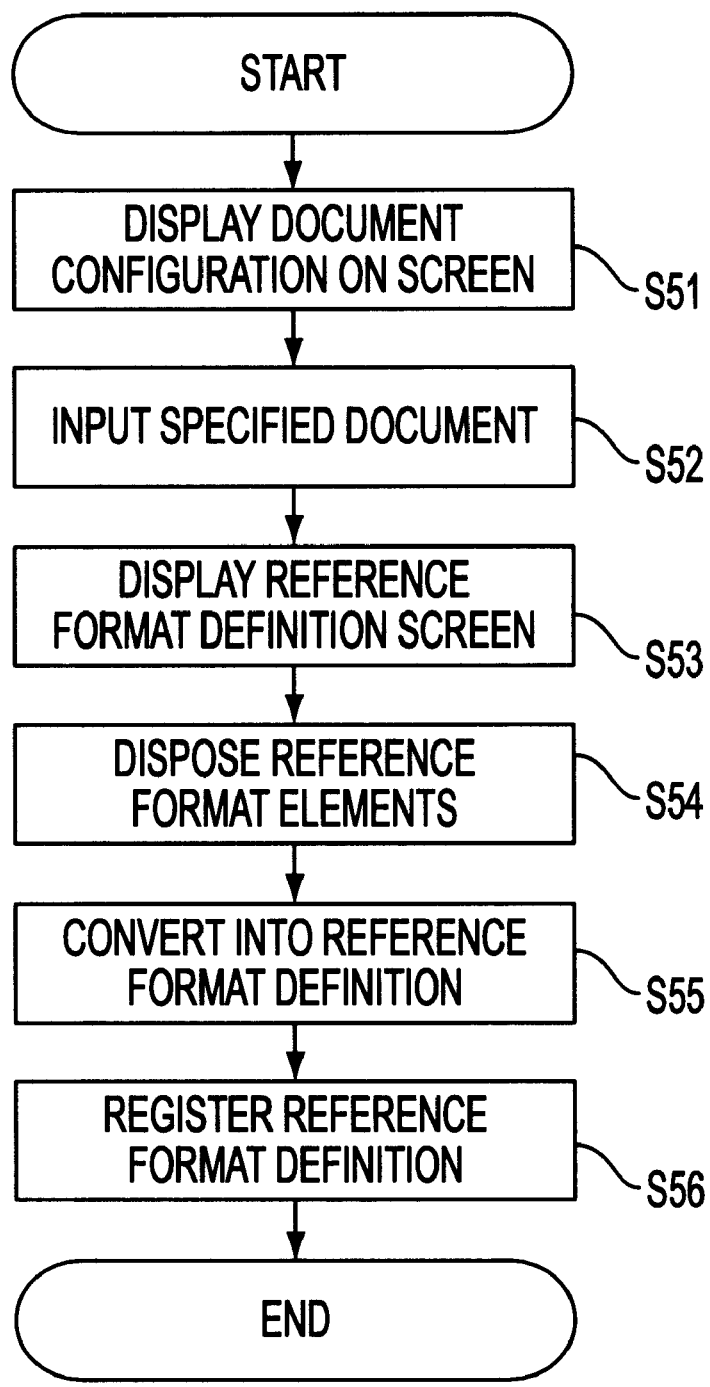
FIG. 31 is a flowchart showing a processing procedure in the twelfth embodiment.

FIG. 30 is a block diagram showing a circuit configuration and information processing procedure in a twelfth embodiment of the present invention and FIG. 31 is a flowchart showing the processing procedure in FIG. 30.

In FIG. 30, the reference numerals 101 and 108 denote screens, wherein the screen 101 (same with that shown in FIG. 22) is a screen for displaying a document configuration and is used by the user to select documents to perform reference format definition and the screen 108 is a screen for reference format definition for creating a reference format definition by disposing displayed document element names.

The reference numeral 111 denotes a document determining section which is constructed in the same manner with that shown in FIG. 24. The reference numeral 116 denotes a reference format definition creating section containing circuit regions 116a through 116e, wherein a display section 116a displays the screen 108 for reference format definition, an data input section 116b accepts information input by the user on the screen 108, a structure analyzing section 116c analyzes structure of reference format definition following to a certain rule from the information input on the screen 108, a reference format definition converting section 116d converts a reference format definition from an analyzed result of the structure analyzing section 116c, and a reference format definition registering section 116e registers a reference format definition to a memory 120j.

The operation will be explained with reference to FIGS. 30 and 31 in the order of the processing procedure.

S51: The data in the memories 120a, 120b and 120c is input by the registered information input section 111a and the screen 101 showing a document configuration is displayed by the display section 111b to specify document names 101a and 101b.

S52: Input data (specified document names) is input to the screen 101 by the input section 111c, positions of frames surrounding the document names specified by the user are analyzed by the position analyzing section 111d from the input data and the data in the memories 120a, 120b and 120c input via the registered information input section 111a and the screen 101a and 101b specified by the user are determined by the document determining section 111.

S53: The screen 102 for reference format definition corresponding to the document names 101a and 101b determined by the document name determining section 111e is displayed by the display section 116a.

S54: Input data to the screen 108 (disposition of document elements during when the document is referenced) is input by the input section 116b.

S55: The structure of the input data input to the screen 108 by the input section 116b is analyzed by the structure analyzing section 116c and is converted to reference format definition by the reference format definition converting section 116d.

S56: The reference format definition converted by the reference format definition converting section 116d is registered to the memory 120j by the reference format definition registering section 116e.

[Thirteenth Embodiment]

Figure 32:
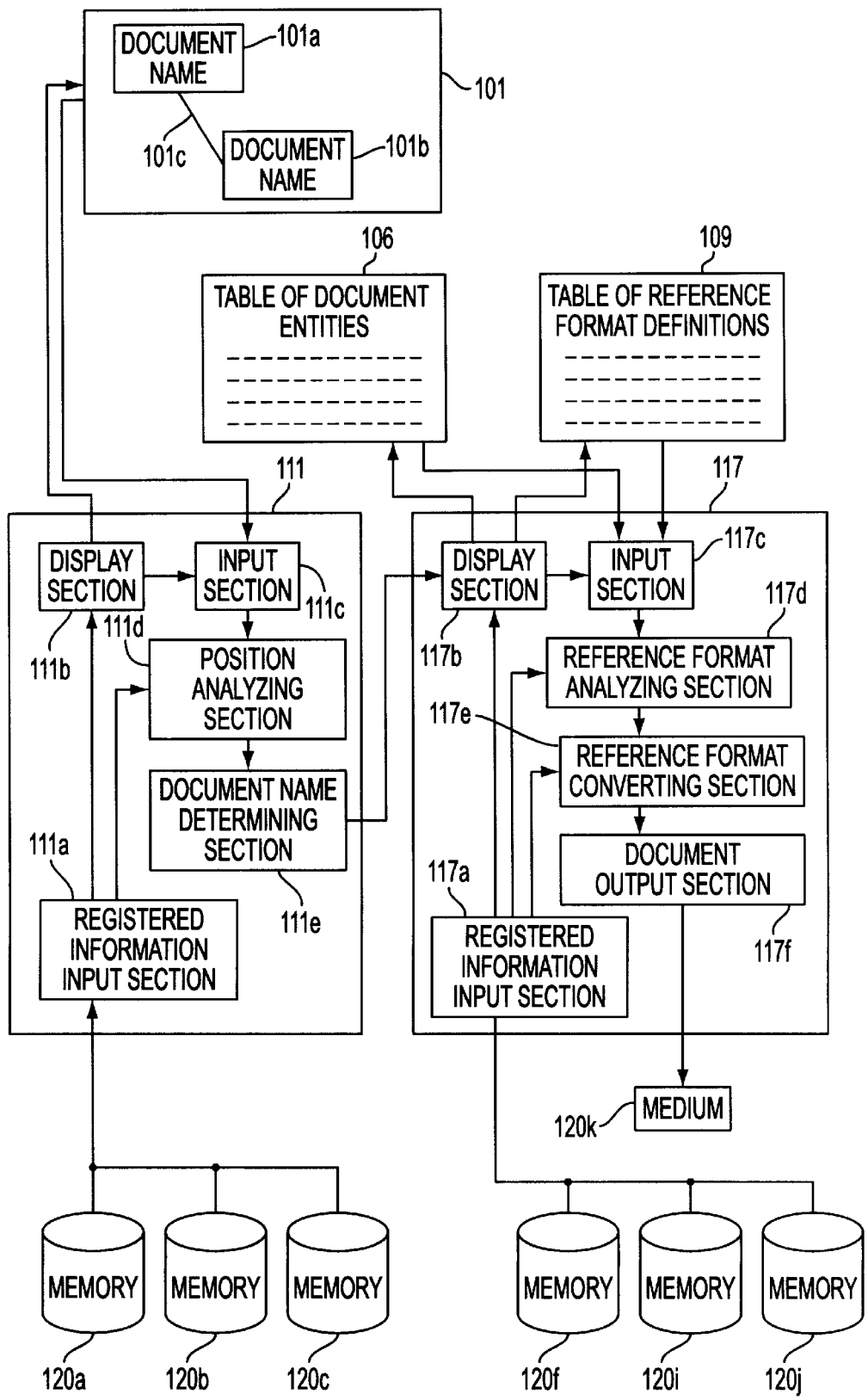
FIG. 32 is a functional block diagram showing a thirteenth embodiment.
Figure 33:
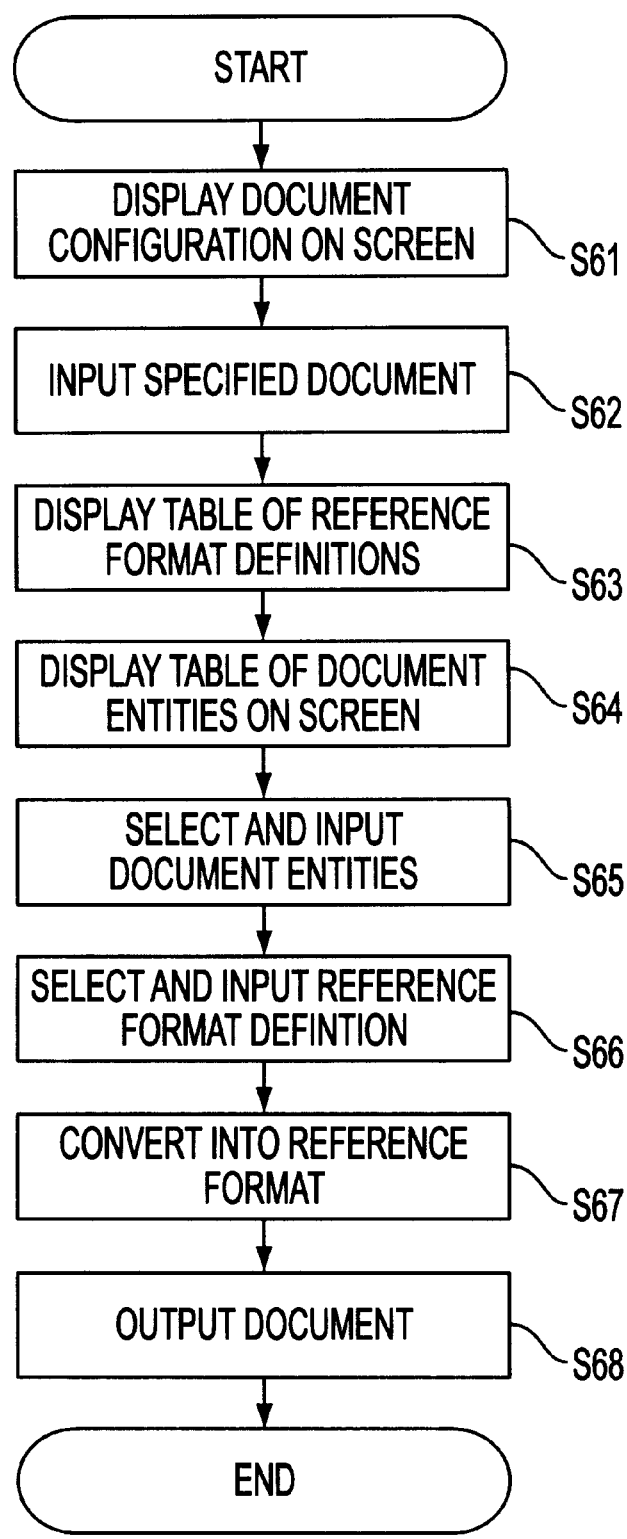
FIG. 33 is a flowchart showing a processing procedure in the thirteenth embodiment.

FIG. 32 is a block diagram showing a circuit configuration and information processing procedure in a thirteenth embodiment of the present invention and FIG. 33 is a flowchart showing the processing procedure in FIG. 32.

In FIG. 32, the reference numerals 101, 106 and 109 denote screens, wherein the screen 101 (the same with that in FIG. 22) is a screen for displaying a document configuration and for selecting documents to be referenced, the screen 106 is the selective screen of the document entity table for selecting an entity of a document to be referenced and the screen 109 is a selective screen of a reference format definition table for selecting a reference format definition used by the user during reference.

The reference numeral 111 denotes a document determining section which is configured in the same manner with that shown in FIG. 24. The reference numeral 117 denotes a reference format output section containing circuit regions 117a through 117f, wherein a registered information input section 117a inputs registered link definition entity of document and reference format definition from the memories 120f, 120i and 120j, a display section 117b displays the selective screen of the document entity table of the 106 and the screen of the reference format definition table of the 109, an input section 117c accepts information input by the user on the screens 106 and 109, a reference format analyzing section 117d analyzes a structure of a reference format definition, a reference format converting section 117e converts a document entity into a reference format from an analyzed result of the reference format analyzing section 117d, and a document output section 117f outputs the entity of document in the reference format converted by the reference format converting section 117e to a medium 120k for ultimately keeping the reference.

The operation will be explained with reference to FIGS. 32 and 33 in the order of the processing procedure.

S61: The data in the memories 120a through 120c is input by the registered information input section 111a to display a document configuration by the display section 111b on the screen 101 to specify the document names 101a and 101b.

S62: Input data (specified documents names) is input to the screen 101 by the input section 111c, positions of frames surrounding the document names 101a and 101b specified by the user are analyzed from the input data and the data of the memories 120a through 120c input via the registered information input section 111a, and the document names 101a and 101b specified by the user are determined by the document name determining section 111e.

S63: The screen 106 showing the document entity table which corresponds to the document names 101a and 101b determined by the document name determining section 111e is displayed on the screen by the display section 117b based on the data of document entity in the memory 120i read via the registered information input section 117a.

S64: The screen of the reference format table which corresponds to the document names 101a and 101b determined by the document name determining section 111e is displayed by the display section 117b from the data of the reference format definition in the memory 120j read via the registered information input section 117a.

S65: Input data to the screen 101 (document entity name to be referenced by the user) is selected and input by the input section 117c.

S66: Input data to the screen 109 (reference format definition which corresponds to the document entity selected by the user on the screen 101) is selected and input by the input section 117c.

S67: The reference format is analyzed by the reference format analyzing section 117d from the data in the memories 120f, 120i and 120j read via the registered information input section 117a and the document entity is converted into a reference format by the reference format converting section 117e.

S68: The document converted into the reference format by the reference format converting section 117e is output to the medium 120k by the document output section 117f FIGS. 34, 35 and 36 are explanatory diagrams (parts I, II and III) showing contents of screens displayed in the eighth to thirteenth embodiments of the present invention. Note that in FIGS. 34 through 36, A through I show examples of screens of document design operations and J through N show examples of data structure of document design information.

Figure 34A:
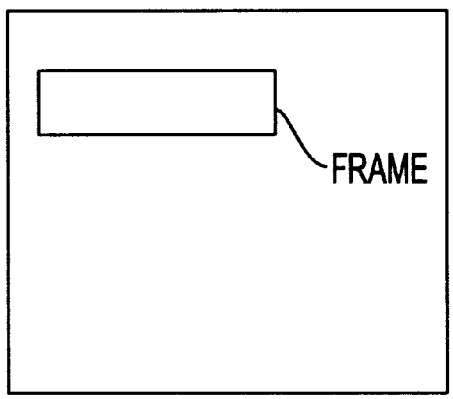
FIGS. 34A through 34F are explanatory diagrams showing contents of displayed screens in the eighth through thirteenth embodiments.
Figure 34B:
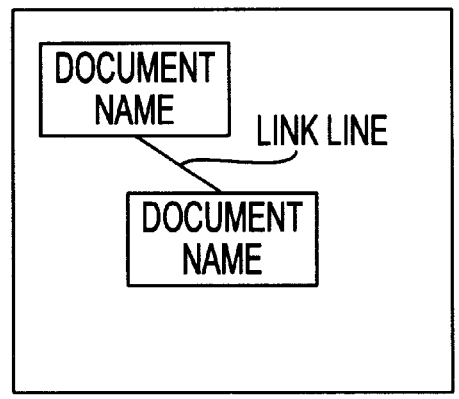

FIG. 34A is the screen when a document name is input (e.g., screen 101 shown in FIG. 22) for inputting the document name within the frame on the screen. FIG. 34B is the screen when the link line is input and drawn (e.g., screen 101 shown in FIG. 22) for connecting two frames in which document names are described by the link line.

Figure 34C:
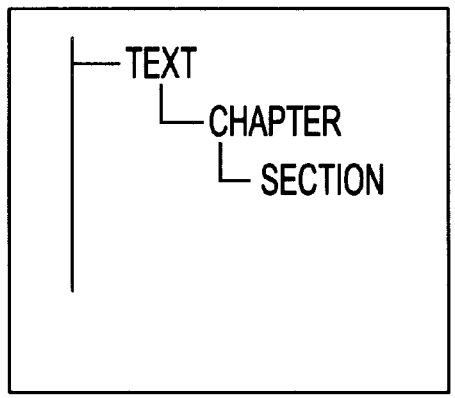
Figure 34D:
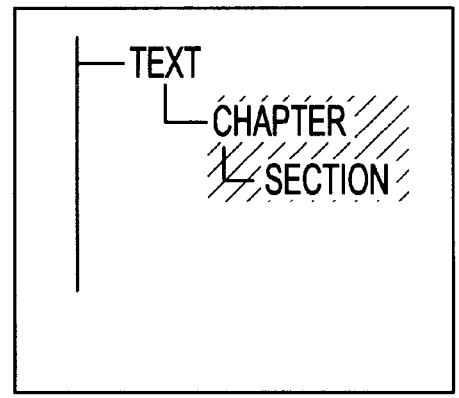

FIG. 34C is the screen for document type definition (the screen 102 in FIG. 24) for inputting relations of document element names (text, chart, section) displayed on the screen 101 and for describing a document structure by horizontal and vertical line. FIG. 34D is the screen (screens 103 and 104 shown in FIG. 26) for specifying the inter-document related range to specify the inter-document related range (halftone portion) with another document.

Figure 34E:
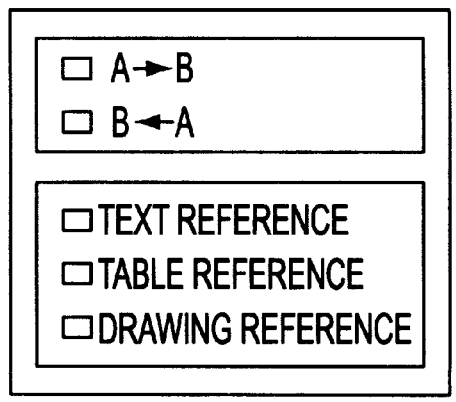

FIG. 34E is the screen for inputting the type of inter-document relationship (screen 105 shown in FIG. 26), i.e. for inputting the type and direction of the inter-document related range specified on the screen D. For example, 'A→B' indicates that document A is referenced to create document B, 'A→B' indicates that document B is referenced to create document A, 'TEXT REFERENCE' indicates that reference information is text, 'TABLE REFERENCE' indicates that reference information is table and 'DRAWING REFERENCE' indicates that reference information is drawing.

Figure 34F:
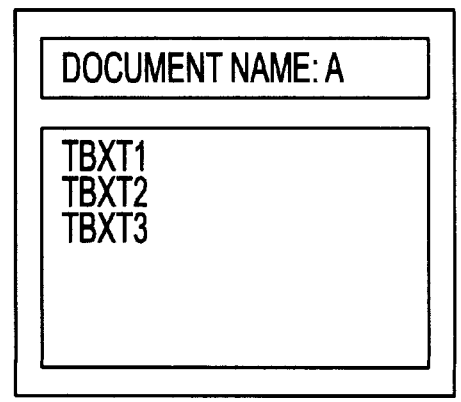

FIG. 34F is the selective screen of the document entity table (screen 106 shown in FIG. 28) showing that a document entity is selected from TEXTs 1, 2 and 3 having the same document name (document type definition is the same) but having different contents.

Figure 35G:
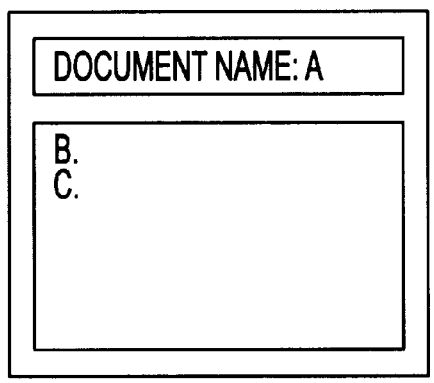
FIGS. 35G through 35K are explanatory diagrams showing contents of displayed screens in the eighth through thirteenth embodiments.
Figure 35H:
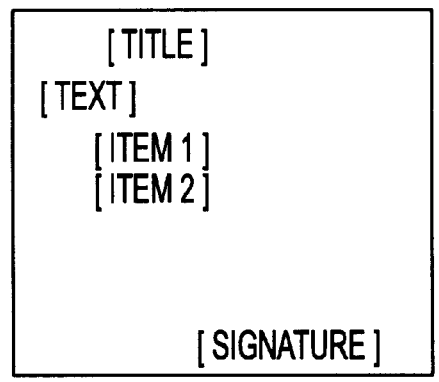

FIG. 35G is the selective screen of the related document table (screen 107 shown in FIG. 28) related to document A showing that documents related to the document A is documents B and C and FIG. 35H is the screen for reference format definition (screen 108 shown in FIG. 30) for disposing document element names (title, text, item 1, item 2, signature) to create a reference format definition.

Figure 35I:
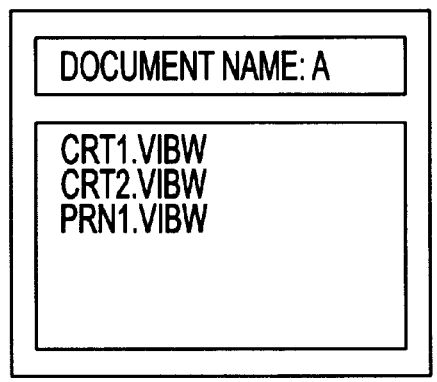

FIG. 35I is the selective screen of reference format definition (screen 109 shown in FIG. 32) for enabling to select a reference format definition defining a reference format of the document A. For example, CRT1. VIEW is a reference format name observed on a first display section, CRT2. VIEW is a reference format name observed on a second display section, and PRN1. VIEW is a screen of a reference format name observed on a first printer.

Figure 35J:
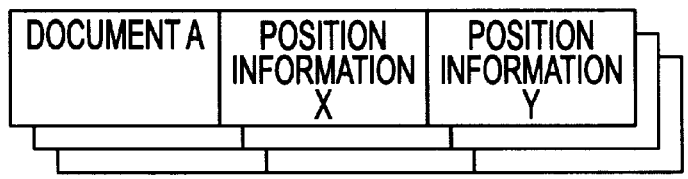
Figure 35K:
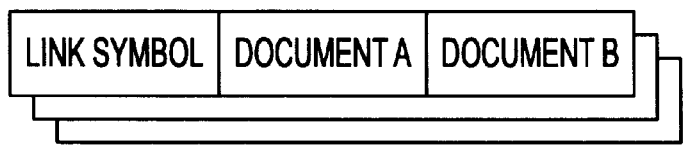

FIG. 35J is the configuration of position information of frame of document A (e.g., information held in the memory 20B shown in FIG. 22) showing the position of the document A (X: vertical, Y: horizontal), FIG. 35K is the configuration of information on a link symbol of documents (e.g., information held in the memory 20c shown in FIG. 22) showing link symbol information of the correlated two documents A and B.

Figure 36L:
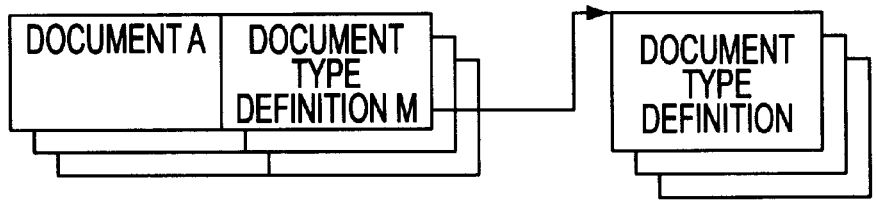
FIGS. 36L through 36N are explanatory diagrams showing contents of displayed screens in the eighth through thirteenth embodiments.

FIG. 36L is the configuration of information of document type definition of the document A (e.g., information held in the memory 20D shown in FIG. 24) showing a document type definition determined by the document A and document type definition name M.

Figure 36M:
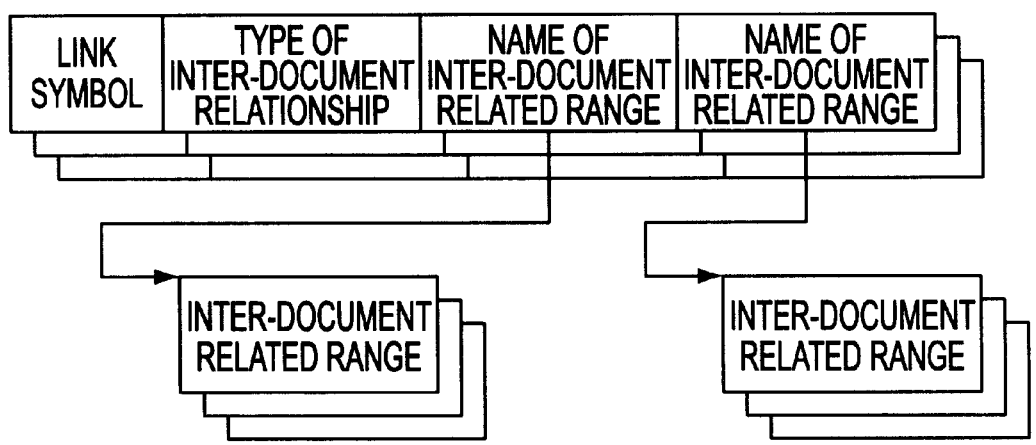

FIG. 36M is the configuration of information of link definition of documents (e.g., information held in the memory 20F shown in FIG. 26) showing a link symbol and type of inter-document relationship of the document A as well as names of inter-document related range and inter-document related range.

Figure 36N:
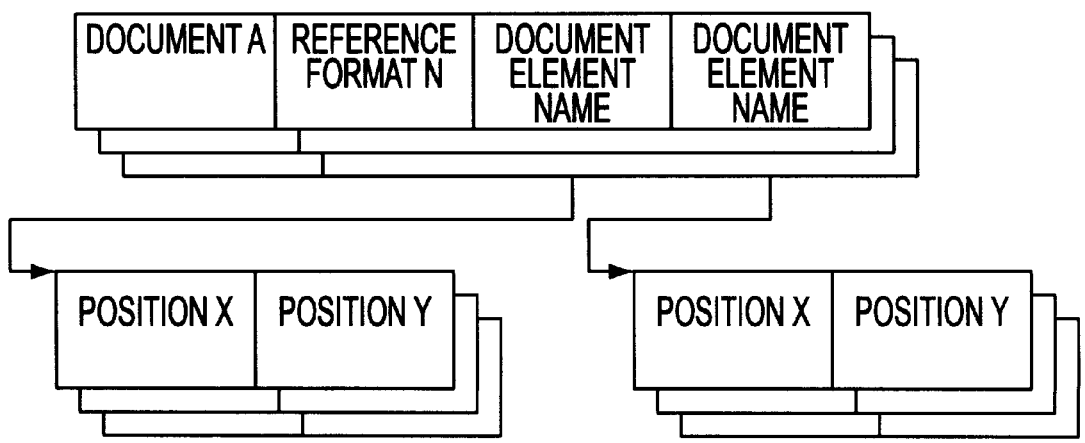

FIG. 36N is the configuration of information of reference format definition of documents (e.g., information held in the memory 20J shown in FIG. 30) showing the document A and a reference format N and document element names which correspond to the reference format N and their position information X and Y.

Figure 37:
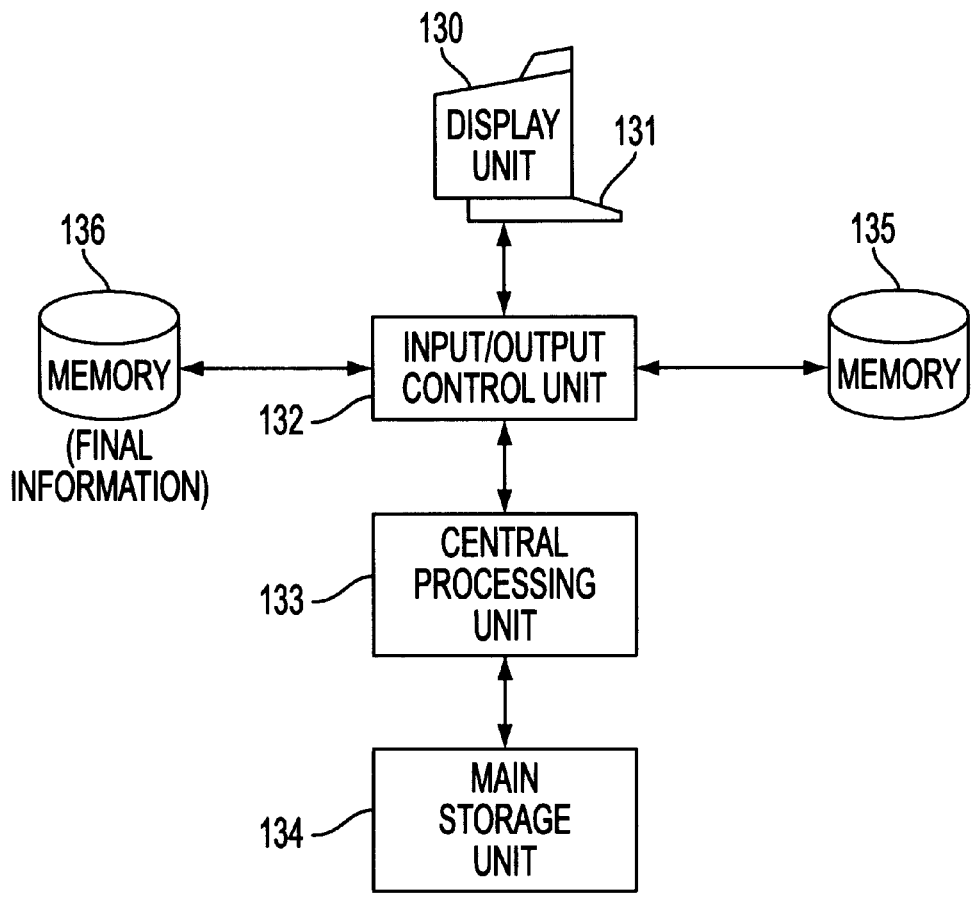
FIG. 37 is an explanatory diagram showing the hardware configuration of the eighth through thirteenth embodiments.

FIG. 37 is a diagram showing a configuration of the units used in the present invention, i.e., a diagram mainly showing the connection of hardware in the configurations in FIGS. 22 through 36. Note that an explanation of the configuration relationship of FIGS. 22 through 33 is omitted to simplify the description.

In FIG. 37, the reference numeral (130) denotes a display unit for displaying input directions and document design information for the user, (131) a keyboard unit for inputting various information, (132) an input/output control unit for controlling input/outputs such as the display of the input direction and document design information for the user and directions input by the user for the system, (133) a central processing unit for executing programs of the system, (134) a main storage unit for keeping the program of the system.

The reference numerals (135 and 136) denote memories, wherein the memory 135 stores the inter-document related range, document name, position information, link symbol information, document type definition, link definition, reference format definition, intermediate information on document entity and the like and the memory 136 holds final information.

The operation in FIG. 37 will be briefly explained. When the user inputs predetermined design information (commands for example) from the keyboard unit 131, the design information goes to the central processing unit 133 via the input/output control unit 132 and the unit 133 executes a processing following to the program stored in the main storage unit 134. The design information is also displayed on the display unit 130 via the input/output control unit 132.

When the user presses a key of the keyboard unit 131 to execute the processing, the data on the screen of the display unit 130 goes to the central processing unit 133 via the input/output control unit 132 and the unit 133 executes the processing following to the program stored in the main storage unit 134. Then, the processing result is temporarily held in the memory 135 as intermediate information.

Such processing is repeatedly executed thereafter and when is finished, the final information is kept in the memory 136. The final information refers to document name, position information, link symbol information, document type definition, link definition, reference format definition, document entity and the like.

Figure 38:
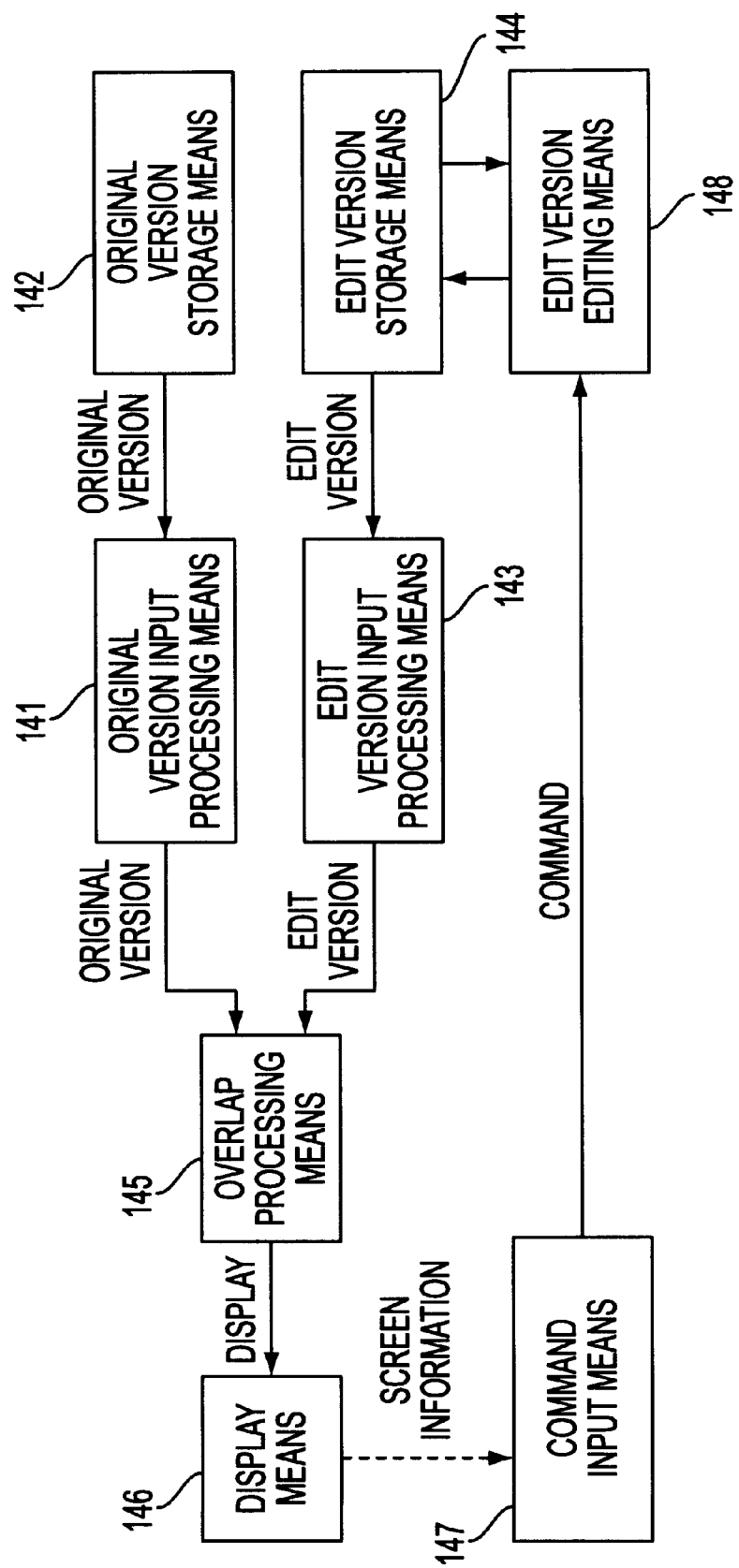

FIG. 38 is a block diagram showing a circuit configuration of a fourteenth embodiment of the present invention, wherein a configuration of one embodiment in methods for displaying original version and edit version documents is described.

In FIG. 38, the reference numeral (141) denotes original version input processing means, (142) original version storage means, (143) edit version input processing means, (144) edit version storage means, (145) overlap processing means, (146) display means, (147) command input means, and (148) edit version editing means.

Figure 39:
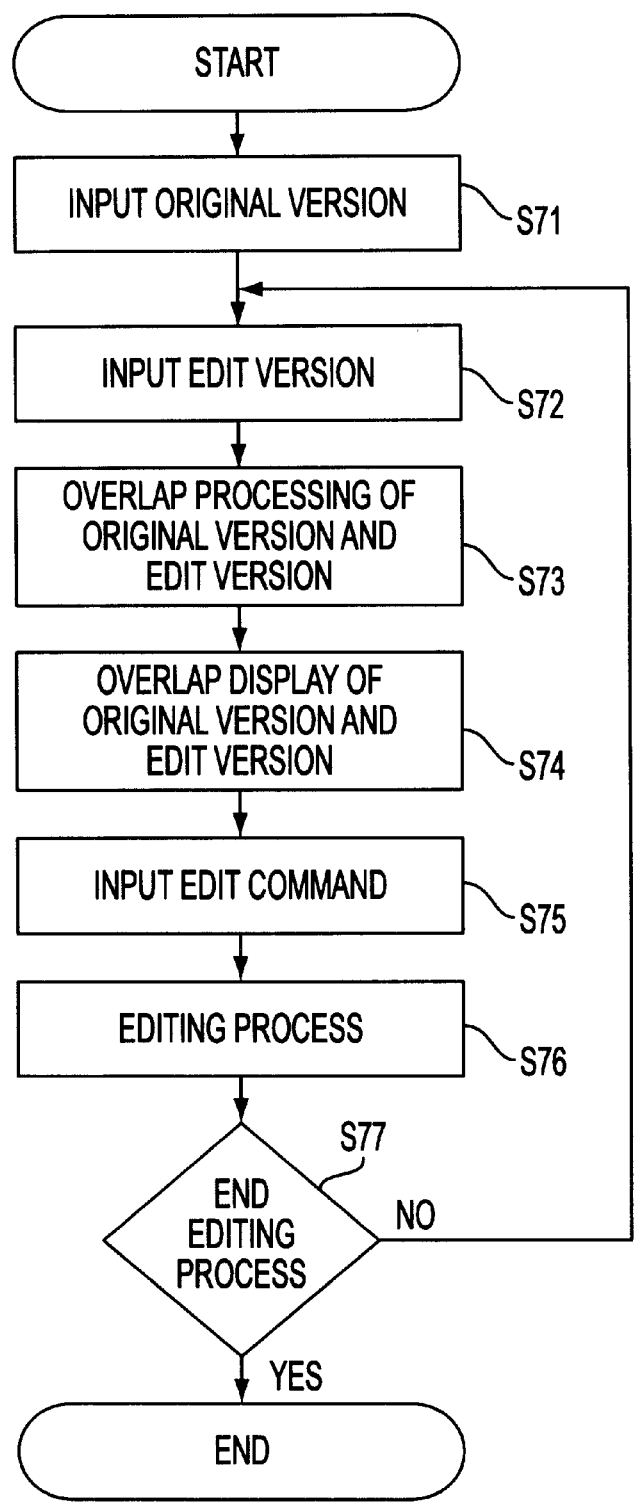
FIG. 39 is a block diagram showing a circuit configuration of a fourteenth embodiment.

FIG. 39 is a flowchart showing the processing procedure in FIG. 38, wherein S** (e.g., S71) indicates a step of each process in the circuit in FIG. 38.

FIGS. 40A through 40G are drawings showing contents of screens displayed in the fourteenth embodiment of the present invention, wherein overlapped display screens A through G of the original version and edit version documents displayed on the display means 146 are drawn. The detail of FIG. 40 will be described later.

FIGS. 38 and 39 will be explained at first.

When the user starts the processing, the original version input processing means 141 reads data of original version from the original version storage means 142 to input the original version data to the overlap processing means 145 (S71).

Next, the edit version input processing means 143 reads data of edit version from the edit version storage means 144 to input the edit version data to the overlap processing means 145 (S72).

The overlap processing means 145 executes an overlapping process (S73) of both original version and edit version data input from the original version input processing means 141 and from the edit version input processing means 143 and displays the both original version and edit version data in an overlapped manner on the display means 146 (S74).

Note that the screens displayed (S74) on the display means 146 are the screens A through G shown in FIG. 40.

Then, when the user determines that it is necessary to edit by seeing the overlapped display screen of the both original version and edit version data on the display means 146, the user inputs edit commands (S75) via the command input means 147 to edit the edit version stored in the edit version storage means 144 under the control of the edit version editing means 148 (S76).

Here the user determines whether the editing process has been finished or not by seeing the overlapped display screen of the both data (S77) and when it is determined in step S77 that the editing process has been finished (YES), the user ends the process as it is. If it is determined in step S77 that the editing process has not been finished (NO), the steps S72 through S76 are repeated.

Because the original version stored in the original version storage means 142 and the edit version stored in the edit version storage means 144 are always displayed in the overlapped manner during when the user inputs edit commands (S75) by the above-mentioned processing, a difference between the original version and edit version may be immediately compared.

Furthermore, when the both original version and edit version data is displayed in the overlapped manner (S74), they may be printed on paper in the same format with the displayed screens A through G shown in FIG. 40 for example by replacing the display means 146 by a printer.

Next, FIGS. 40A through 40G will be explained. FIGS. 40A through 40G show screens of seven overlapping processes.

In the display screen A, the original version is shown by a blue line, the edit version is shown by a red line and an overlapped portion of the original version and edit version is shown by a purple line; the comparison of the original version and edit version is facilitated by the difference of the displayed colors.

In the display screen B, the edit version is shown in the position of thin graphic pattern and the original version is shown in the position of dense graphic pattern and the comparison of the both is facilitated by showing the edit version and original version up and down on the different lines.

In the display screen C, the original version is moved to the lower right from the position where the original version (dotted line in FIG. 40C) and the edit version (solid line in FIG. 40C) are overlapped to facilitate the comparison of the original version and edit version from the offset of the position.

In the display screen D, the edit version (solid line in FIG. 40D) and the original version (dotted line in FIG. 40D) are alternately flashed to facilitate the comparison of the both.

In the display screen E, the original version is shown by a low luminance line, the edit version is shown by a high luminance line and the overlapped portion of the original version and edit version is shown by a intermediate luminance line to facilitate the comparison of the original version and edit version by the difference of the luminance.

In the display screen F, the edit version is shown by Gothic type and the original version is shown by Mincho type (font for displaying Japanese: corresponds to Roman type in alphabet) to facilitate the comparison of the both by the difference of the fonts.

In the display screen G, the original version is shown by a thin line, the edit version is shown by a thick line and the overlapped portion of the original version and edit version is shown by a dotted line to facilitate the comparison of the original version and edit version by the difference of the types of the lines.

What is claimed is:

1. A document creation supporting system for partializing at least a portion of contents described in a document, comprising:

specifying means for specifying a part of contents of the document;

recording means for recording the part in a file separated from the document together with a part holding mark having a title indicating that the part is being held, a document name of the document referencing the part and an identifier corresponding to a type of the part;

adding means for adding to the file holding the part, at a position before and after contents of the part, a part holding mark having a title indicating that the part is being held, a document name of the document referencing the part and an identifier corresponding to a type of the part, and at a position in the file where the part of the document is specified, a part reference mark having a title indicating that the part is to be referenced, a file name and a file format of the file in which the contents of the part are stored, and a version number information of the part;

inserting means for inserting into the document, at a position where the part is referenced, a part reference mark having a title indicating that the part is to be referenced, a name of the file holding the content of the part, a file format of the file holding the part, the identifier corresponding to the type of the part and the version number information of the part; and deleting means for deleting the part from the document.

2. The document creation supporting system according to claim 1 having display means for displaying the content of the part without displaying the part reference mark after reading the file or document having the part when the document referencing the part is displayed.

3. The document creation supporting system according to claim 1 having:

keeping means for keeping the file or document having the part under a version number management when the content of the part is modified in the document referencing the part; and updating means for updating the part version number information within the part reference mark existing in other documents referencing the original version number of the part when the part version number information within the part reference mark is updated.

4. The document creation supporting system according to claim 1 comprising:

selecting means for selecting, when a content of the part is modified in a document referencing the part, whether information within the part holding mark existing within the file or document having the part should be updated or not;

updating means, used when updating, for keeping the file or document having the part under the version number control and updating the version number information within the part reference mark as well as updating the part version information number within the part reference mark existing in the other document referencing the original version number of the part; and deleting means for keeping the file or document having the part under the version number control and updating the version number information within the part reference mark as well as deleting the part holding document name.

5. The document creation supporting system according to claim 1 having updating means for updating the part version number information within the part reference mark in all documents referencing the part when the content of the part is modified in the file or document having the part.

6. The document creation supporting system according to claim 1 comprising:

selecting means for allowing, when the content of the part is modified in the file or document having the part, to select whether contents of the documents referencing the part should be updated or not per each document;

updating means for updating the part version number information within the part reference mark when updating; and deleting means for deleting the corresponding document name from part reference document names within the part holding mark existing in the document having the modified part without updating the part version number information within the part reference mark when not updating.

7. The document creation supporting system according to claim 1 comprising mark adding means for adding, when an element described in one document and an element described in another document are described in a related manner, a succeeding original mark having a title indicating that the element is related to the other document, identifier and file name of the other document before and after the element within one document and a succeeding destination mark having a title indicating that the element is succeeded from the other document, identifier and file name of one document before and after the element within the other document.

8. The document creation supporting system for partializing at least a portion of contents described in a document, comprising:

specifying means for specifying a part of a content in the document;

adding means for adding, at a position before and after the part, a part holding mark having a title indicating that the part is being held, a document name of a document referencing the Part and an identifier corresponding to a type of the part;

inserting means for inserting, at a position where the part is referenced in another document, a part reference mark having a title indicating that the part is to be referenced, a name of the document holding the part, a file format of the document holding the part, the identifier corresponding to the type of the part and a version number information of the part; and process control mark adding means for adding, when a plurality of documents are prepared sequentially along a predetermined flow and when content of an element which should be described in one document in the flow cannot be described a process control mark having a name indicating that the description of the element is reserved, identifier and information indicating a time or operation by which the description of the element has to be completed, before and after the element.

9. A document creation supporting apparatus for designing a document displayed on a screen using a central control unit, comprising:

display means for displaying a screen for showing a configuration of a document to be designed by a user;

document name analyzing means for inputting input data of document names input by the user within frames on the screen by an input device and for analyzing the document names from the input data;

document name registering means for registering the document names analyzed by said document name analyzing means in a memory;

position analyzing means for analyzing positions of the frames surrounding the document names described on the screen and specified by said input data input to the screen and a position of a link line input to connect the two frames by other input data;

position registering means for registering the positions of the frames analyzed by said position analyzing means by correlating with the corresponding document names in a temporary holding memory;

link symbol generating means for reading the two document names corresponding to the position of the link line analyzed by said position analyzing means from the data held in the memory via a registered information input device to generate a link symbol which corresponds to the two document names; and link symbol registering means for registering the link symbol generated by said link symbol generating means in a memory by correlating with the two document names.

10. A document creation supporting system, comprising:

display means for displaying a screen for showing a configuration of a document to be designed by a user;

document name analyzing means for inputting input data of document names input by the user within frames on the screen by an input device and for analyzing the document names from the input data;

document name registering means for registering the document names analyzed by said document name analyzing means in a memory;

position analyzing means for analyzing positions of the frames surrounding the document names described on the screen and specified by the input data and a position of a link line input to connect the two frames by other input data;

position registering means for registering the positions of the frames analyzed by said position analyzing means by correlating with the corresponding document names in a temporary holding memory;

link symbol generating means for reading the two document names corresponding to the position of the link line analyzed by said position analyzing means from the data held in the memory via a registered information input device to generate a link symbol which corresponds to the two document names;

link symbol registering means for registering the link symbol generated by said link symbol generating means in a memory by correlating with the two document names;

display means for displaying held data of said document names read from said memory on a screen to specify a desired document name;

position analyzing means for inputting input data of the desired document name specified by the user on the screen from the input device and for analyzing a position of a frame surrounding the specified document name from said input data and the data held in the memory read via said registered information input device;

document determining means including a document name determining section for determining the document name specified based on the analyzed result of said position analyzing means;

display means for hierarchically displaying document element names of the document name determined by said document determining means;

input means for inputting input data of the document element names described in a hierarchical manner input by the user to the screen and line data connecting between the document element names;

type definition converting means for analyzing the hierarchical description of the document element names and the line data connecting the document element names input by said input device by a structure analyzing device to convert to a document type definition; and type definition creating means including type definition registering means for registering the document type definition converted by said type definition converting means in a temporary holding memory.

11. The document creation supporting system according to claim 10, comprising:

display means for reading the data held in said memory by the registered information input device to display a screen by which the user specifies a link line;

relation determining means including link determining means for inputting input data input by the user by specifying the link line on the screen by said input device, for analyzing a position of the specified link line based on said input data and the data held in said memory and read via the registered information input device and for determining the specified link line;

display means for reading a document type definition of a document which corresponds to the link line symbol determined by said relation determining means from the data held in said memory by the registered information input to display as a screen by which the user specifies inter-document related range;

temporary registering means for inputting input data input by the user for specifying the inter-document related range by the input device to temporarily register in a memory;

input means for displaying related screens showing types of document relationships of a plurality of screens and for inputting input data which corresponds to said related screen to input an inter-document relationship;

range analyzing means for reading data from the type definition data memory holding the document type definition data and from the relation data holding memory holding the inter-document related range via said registered information input device to analyze inter-document related range between the screens;

link definition converting means for creating a link definition from the result analyzed by said range analyzing means and from the input data which corresponds to the screen; and link definition creating means including link definition registering means for registering the link definition converted by said link definition converting means in a temporary holding memory;

wherein a portion of the document type definition which corresponds to the related range between two documents being kept in correspondence with the input type of the inter-document relationship.

12. The document creation supporting system according to claim 11 comprising:

registered information input means for inputting data held in the memories;

document determining means for outputting the determined document name;

display means for reading a document entity which corresponds to the document name determined by said document determining means from the memory via said registered information input device to display on the screen and for reading the document name correlated by the link definition with the document name determined by said document determining means from data held in the memory via said registered information input device to display on the screen;

input means for inputting input data in the selection of the document entity converted by the user corresponding to the screen and data of the document name at the conversion destination of the document entity selected by the user corresponding to the screen;

relation analyzing means for analyzing a converted portion of data input by said input device and each data of the link definition read from the memory via the registered information input device;

relation converting means for converting the document entity selected by the user on the screen into a relational document to create a new document; and document registering means for registering the relational document created by said relation converting means in a memory;

wherein said document entity being converted into a format determined by another document type definition by specifying a relational document name related to the document name to which said document entity belongs.

13. The document creation supporting system according to claim 12 comprising:

document determining means for inputting the data held in the memory via said registered information input device to implement various processing to output the determined document name;

display means for displaying a screen which corresponds to the document name determined by said document determining means;

input means for inputting input data for disposing document elements when the document is referenced corresponding to said screen;

reference format definition converting means for analyzing a structure of the input data which corresponds to the screen input by said input device by structure analyzing means to convert into a reference format definition; and reference format definition registering means for registering the reference format definition converted by said reference format definition converting means into a memory;

wherein the information on the disposition of document element names being converted into and stored as the reference format definition following to a predetermined rule by disposing the document element names in the document type definition by adjusting with the relative position when displaying or outputting by a printer.

14. The document creation supporting system according to claim 13 comprising:

document determining means for inputting the data held in said memory by said registered information input device to perform various processing to output a determined document name;

display means for reading the document entity which corresponds to the document name determined by said document determining means from said memory via said registered information input device to display as a screen and reading the reference format definition which corresponds to the document name determined by said document determining means from said memory via said registered information input device to display as a screen;

input means for inputting input data of names of the document entity which the user references to the screen and for inputting data of reference format definition which corresponds to the document entity selected by the user to the screen; and document output means for analyzing the reference format by reference format analyzing means from the data held in said memory read via said registered information input device and for converting the document entity into the reference format to output a document converted to the reference format by said reference format converting means;

wherein said document entity being converted into the reference format to be output by specifying the reference format definition which corresponds to the document name to which said document entity belongs.

15. A document creation supporting system, comprising:

original version input processing means for inputting original version documents and graphics;

original version storage means for storing the documents and graphics used by said original version input processing means;

edit version input processing means for inputting edit version documents and graphics;

edit version storage means for storing the documents and graphics used by said edit version input processing means;

overlap processing means for processing, by overlapping, two outputs including graphics of said original version input processing means and edit version input processing means;

display means for displaying original version documents and said edit version documents simultaneously;

command input means for inputting commands in correspondence to the overlap state of said display means; and edit version editing means for controlling said edit version input processing means based on the commands.

16. The document creation supporting system according to claim 15 comprising at least one function among the following functions as a method for differentiating the original version and edit version displayed by said display means:

a function for differentiating displayed colors of the original version, edit version and overlapped portion of the original version and edit version;

a function for differentiating lines of the original version and edit version documents;

a function for displaying by moving only the edit version or original version from a position where the original version and edit version are overlapped;

a function for displaying by alternately flashing the original version and edit version;

a function for differentiating luminances of the original version, edit version and overlapped portion of the original version and edit version;

a function for differentiating typefaces of the original version and edit version; or a function for differentiating types of lines of the original version, edit version and overlapped portion of the original version and edit version.

17. A document creation supporting system for of document names input by the user within frames on the screen by an input device and for analyzing the document names from the input data;

document name registering means for registering the document names analyzed by said document name analyzing means in a memory;

position analyzing means for analyzing positions of the frames surrounding the document names described on the screen and specified by said input data input to the screen and a position of a link line input to connect the two frames by other input data;

position registering means for registering the positions of the frames analyzed by said position analyzing means by correlating with the corresponding document names in a temporary holding memory;

link symbol generating means for reading the two document names corresponding to the position of the link line analyzed by said position analyzing means from the data held in the memory via a registered information input device to generate a link symbol which corresponds to the two document names;

link symbol registering means for registering the link symbol generated by said link symbol generating means in a memory by correlating with the two document names;

display means for displaying held data of said document names read from said memory on a screen to specify a desired document name;

said position analyzing means for inputting input data of the desired document name specified by the user on the screen from the input device and for analyzing a position of a frame surrounding the specified document name from said input data and the data held in the memory read via said registered information partializing at least a portion of contents described in a document, comprising:

specifying means for specifying a part of a content in the document;

adding means for adding, at a position before and after the part, a part holding mark having a title indicating that the part is being held, a document name of a document referencing the part and an identifier corresponding to a type of the part;

inserting means for inserting, at a position where the part is referenced in another document, a part reference mark having a title indicating that the part is to be referenced, a name of a document holding the part, a file format of the document holding the part, the identifier corresponding to the type of the part and a version number information of the part; and process control mark adding means for adding, when a plurality of documents are prepared sequentially along a predetermined flow and when a content of an element which should be described in one document in the flow cannot be described, a process control mark having a name indicating that the description of the element is reserved, identifier and information indicating a time or operation by which the description of the element has to be completed, before and after the element.

18. A document creation supporting apparatus for designing a document displayed on a screen using a central control unit, comprising:

display means for displaying a screen for showing a configuration of a document to be designed by a user;

document name analyzing means for inputting input data input device;

document determining means including a document name determining section for determining the document name specified based on the analyzed result of said position analyzing means;

display means for hierarchically displaying document element names of the document name determined by said document determining means;

input means for inputting input data of the document element names described in a hierarchical manner input by the user to the screen and line data connecting between the document element names;

type definition converting means for analyzing the hierarchical description of the document element names and the line data connecting the document element names input by said input device by a structure analyzing device to convert to a document type definition; and type definition creating means including type definition registering means for registering the document type definition converted by said type definition converting means in a temporary holding memory.

19. The document creation supporting system according to claim 18, further comprising:

display means for reading the data held in said memory by the registered information input device to display a screen by which the user specifies a link line;

relation determining means including link determining means for inputting input data input by the user by specifying the link line on the screen by said input device, for analyzing a position of the specified link line based on said input data and the data held in said memory and read via the registered information input device and for determining the specified link line;

display means for reading a document type definition of a document which corresponds to the link line symbol determined by said relation determining means from the data held in said memory by the registered information input to display as a screen by which the user specifies inter-document related range;

temporary registering means for inputting input data input by the user for specifying the inter-document related range by the input device to temporarily register in a memory;

input means for displaying related screens showing types of document relationships of a plurality of screens and for inputting input data which corresponds to said related screen to input an inter-document relationship;

range analyzing means for reading data from the type definition data memory holding the document type definition data and from the relation data holding memory holding the inter-document related range via said registered information input device to analyze inter-document related range between the screens;

link definition converting means for creating a link definition from the result analyzed by said range analyzing means and from the input data which corresponds to the screen; and link definition creating means including link definition registering means for registering the link definition converted by said link definition converting means in a temporary holding memory;

wherein a portion of the document type definition which corresponds to the related range between two documents being kept in correspondence with the input type of the inter-document relationship.

20. The document creation supporting system according to claim 19, further comprising:

registered information input means for inputting data held in the memories;

document determining means for outputting the determined document name;

display means for reading a document entity which corresponds to the document name determined by said document determining means from the memory via said registered information input device to display on the screen and for reading the document name correlated by the link definition with the document name determined by said document determining means from data held in the memory via said registered information input device to display on the screen;

input means for inputting input data in the selection of the document entity converted by the user corresponding to the screen and data of the document name at the conversion destination of the document entity selected by the user corresponding to the screen;

relation analyzing means for analyzing a converted portion of data input by said input device and each data of the link definition read from the memory via the registered information input device;

relation converting means for converting the document entity selected by the user on the screen into a relational document to create a new document; and document registering means for registering the relational document created by said relation converting means in a memory;

wherein said document entity being converted into a format determined by another document type definition by specifying a relational document name related to the document name to which said document entity belongs.

21. The document creation supporting system according to claim 20, further comprising:

document determining means for inputting the data held in the memory via said registered information input device to implement various processing to output the determined document name;

display means for displaying a screen which corresponds to the document name determined by said document determining means;

input means for inputting input data for disposing document elements when the document is referenced corresponding to said screen;

reference format definition converting means for analyzing a structure of the input data which corresponds to the screen input by said input device by structure analyzing means to convert into a reference format definition; and reference format definition registering means for registering the reference format definition converted by said reference format definition converting means into a memory;

wherein the information on the disposition of document element names being converted into and stored as the reference format definition following to a predetermined rule by disposing the document element names in the document type definition by adjusting with the relative position when displaying or outputting by a printer.

22. The document creation supporting system according to claim 21, further comprising:

document determining means for inputting the data held in said memory by said registered information input device to perform various processing to output a determined document name;

display means for reading the document entity which corresponds to the document name determined by said document determining means from said memory via said registered information input device to display as a screen and reading the reference format definition which corresponds to the document name determined by said document determining means from said memory via said registered information input device to display as a screen;

input means for inputting input data of names of the document entity which the user references to the screen and for inputting data of reference format definition which corresponds to the document entity selected by the user to the screen; and document output means for analyzing the reference format by reference format analyzing means from the data held in said memory read via said registered information input device and for converting the document entity into the reference format to output a document converted to the reference format by said reference format converting means;

wherein said document entity being converted into the reference format to be output by specifying the reference format definition which corresponds to the document name to which said document entity belongs.

* * * * *

UNITED STATES PATENT AND TRADEMARK OFFICE
CERTIFICATE OF CORRECTION

PATENT NO. : 5,991,782
DATED : November 23, 1999
INVENTOR(S) : Junichi Miyagawa, et al.

Page 1 of 1

It is certified that error appears in the above-identified patent and that said Letters Patent is hereby corrected as shown below:

Title page, under

--FOREIGN APPLICATION PRIORITY DATA-- insert
Japan 6-142744    06/24/1994
Japan 6-021057    02/18/1994--

Signed and Sealed this

Seventeenth Day of July, 2001

*Attest:*

NICHOLAS P. GODICI
*Attesting Officer*    *Acting Director of the United States Patent and Trademark Office*